(12) United States Patent
Akin et al.

(10) Patent No.: US 11,525,740 B2
(45) Date of Patent: Dec. 13, 2022

(54) METHODS OF MEASURING REAL-TIME JUNCTION TEMPERATURE IN SILICON CARBIDE POWER MOSFET DEVICES USING TURN-ON DELAY, RELATED CIRCUITS, AND COMPUTER PROGRAM PRODUCTS

(71) Applicant: Board of Regents, The University of Texas System, Austin, TX (US)

(72) Inventors: Bilal Akin, Richardson, TX (US); Fei Yang, Plano, TX (US); Shi Pu, Plano, TX (US); Chi Xu, Plano, TX (US); Bhanu Vankayalapati, Richardson, TX (US)

(73) Assignee: Boards of Regents, The University of Texas System, Austin, TX (US)

( * ) Notice: Subject to any disclaimer, the term of this patent is extended or adjusted under 35 U.S.C. 154(b) by 290 days.

(21) Appl. No.: 16/908,997

(22) Filed: Jun. 23, 2020

(65) Prior Publication Data

US 2021/0396596 A1 Dec. 23, 2021

(51) Int. Cl.
*G01K 7/00* (2006.01)
(52) U.S. Cl.
CPC ...................................... *G01K 7/00* (2013.01)
(58) Field of Classification Search
CPC ........................................................ G01K 7/00
USPC ......................................................... 374/178
See application file for complete search history.

(56) References Cited

U.S. PATENT DOCUMENTS 11,397,209 B2 * 7/2022 Akin ................... G01R 31/2644

FOREIGN PATENT DOCUMENTS

| CN | 112731091 A | * | 4/2021 | |
| CN | 114414975 A | * | 4/2022 | |
| WO | WO-2021119989 A1 | * | 6/2021 | ............... G01K 7/01 |

OTHER PUBLICATIONS

Griffo et al.; *Real-Time Measurement of Temperature Sensitive Electrical Parameters in SiC Power MOSFETs*; IEEE Transactions on Industrial Electronics, vol. 65, No. 3; Mar. 2018; pp. 2663-2671.
Niu et al.; *Sensing Power MOSFET Junction Temperature Using Circuit Output Current Ringing Decay*; IEEE Transactions on Industry Applications, vol. 51, No. 2; Mar./Apr. 2015; pp. 1763-1773.

(Continued)

*Primary Examiner* — Mirellys Jagan
(74) *Attorney, Agent, or Firm* — Stanek Lemon Crouse & Meeks, P.A.

(57) ABSTRACT

A method of measuring a junction temperature of a SiC MOSFET can be provided by applying a gate-source voltage to an external gate loop coupled to a gate of the SiC MOSFET, detecting a first time when the gate-source voltage exceeds a first value configured to disable conduction of a current in a drain of the SiC MOSFET, detecting, after the first time, a second time when a voltage across a common source inductance in a package of the SiC MOSFET indicates that the current in the drain is greater than a reference value, defining a time interval from the first time to the second time as a turn on delay time of the SiC MOSFET and determining the junction temperature for the SiC MOSFET using the turn on delay time.

10 Claims, 22 Drawing Sheets

(56) References Cited

OTHER PUBLICATIONS

Gonzalez et al.; *An Investigation of Temperature-Sensitive Electrical Parameters for SiC Power MOSFETs*; IEEE Transactions on Power Electronics, vol. 32; No. 10; Oct. 2017; pp. 7954-7966.

Luo et al.; *Junction Temperature Extraction Approach with Turn-Off Delay Time for High-Voltage High-Power IGBT Modules*; IEEE Transactions on Power Electronics; vol. 31; No. 7; Jul. 2016; pp. 5122-5132.

Dyer et al.; *Online Condition Monitoring of SiC Device using Gate Drive for Converter Performance Improvement*; IEEE Xplore; (2016); pp. 182-187.

Zhang et al.; *Online Junction Temperature Monitoring using Intelligent Gate Drive for SiC Power Devices*; IEEE Transactions on Power Electronics; vol. 34; No. 8; Aug. 2019; pp. 7922-7932.

Niu et al.; *Sensing Power MOSFET Junction Temperature using Gate Drive Turn-On Current Transient Properties*; IEEE Transactions on Industry Applications; vol. 52; No. 2; Mar./Apr. 2016; pp. 1677-1687.

Baker et al.; *Online Junction Temperature Measurement using Peak Gate Current*; IEEE Xplore (2015) pp. 1270-1275.

Wang et al.; *SiC Device Junction Temperature Online Monitoring*; IEEE Xplore (2018); pp. 387-392.

Chen et al.; *On-line Monitoring of the MOSFET Device Junction Temperature by Computation of the Threshold Voltage*; IEEE Xplore; Jun. 2, 2020; pp. 440-444.

Shi et al. *Junction Temperature Measurement Method for Power MOSFETs Using Turn-On Delay of Impulse Signal*; IEEE Transactions on Power Electronics, vol. 33; No. 6; Jun. 2018; pp. 5274-5282.

\* cited by examiner

METHODS OF MEASURING REAL-TIME JUNCTION TEMPERATURE IN SILICON CARBIDE POWER MOSFET DEVICES USING TURN-ON DELAY, RELATED CIRCUITS, AND COMPUTER PROGRAM PRODUCTS

FIELD

The present invention relates to the field of electronics in general, and more particularly, to SiC power MOSFET devices.

BACKGROUND

Among the various online junction temperature measurement methods for SiC MOSFETs, temperature sensitive electrical parameters (TSEPs) have been adopted through cost-effective plug-in circuits, that may provide an indirect indication of the device's junction temperature. Compared to the direct methods using on-chip sensors [or optical sensors embedded into the package, most TSEPs based measurement methods are non-invasive and do not require device or package modifications.

Various TSEPs have been utilized for real-time measurement in SiC MOSFETs. Relying on the temperature coefficients of the channel resistance and drift region resistance, the on-resistance of the SiC MOSFETs can be used for estimation. Online measurement can be realized by measuring the device's current/voltage simultaneously or by measuring the time constant of the current ringing decay. However, due to the competition effect of the different temperature coefficients in the channel resistance and drift-region resistance the on-resistance change over can be non-linear and some devices may show non-monolithic characteristics. To improve the linearity, the turn-on di/dt rate can be used for estimation in SiC MOSFETs. Real-time measurement may be possible by detecting the peak voltage across the source parasitic inductance during turn-on. The sensitivity can be increased by slowing down the turn-on process. Similarly, the turn-off delay time may also have a linear relationship with Tj at a given load current, and the sensitivity can be improved by increasing the turn-off gate resistance with intelligent gate drive circuits. However, the TSEPs like on-resistance, turn-on di/dt and turn-off delay time can be load dependent. As the load current changes, the calibration curve may also shift. Hence, a complicated mapping may be required for online estimation.

To address the load dependency, other TSEPs like threshold voltage, internal gate resistance and turn-on delay time have also been proposed. However, for high voltage SiC MOSFETs with an isolation barrier between the power stage and control unit, even the state-of-art isolated ADCs may fail to meet the accuracy and speed requirements simultaneously. Thus, online measurement may become impractical.

Relying on the temperature coefficient of the device's internal gate resistance, the peak gate current during the turn-on delay period can also be used for measurement in SiC MOSFETs. Online measurement can be realized with the peak gate current detection circuit. However, the linearity and sensitivity of this method may be highly dependent on the gate metallization material, gate layout, and fabrication process.

Based on the Vth versus Tj relationship, the turn-on delay time can be used as another TSEP. Utilizing the parasitic inductance in the power loop, the turn-on delay time is measured and used for measurement in Si MOSFETs. Nonetheless, the circuit design for turn-on delay time measurement and online implementation have not been discussed exhaustively.

Both the gate oxide and the packaging elements can degrade as a SiC MOSFET device ages, which may also affect the TSEPs. The gate oxide degradation or instability in SiC MOSFETs can cause TSEPs like on-resistance, threshold voltage, turn-on di/dt, turn-off delay time, and turn-on delay time to change. As a result, the measurement becomes inaccurate. SiC MOSFET package degradation (i.e. the wire bond liftoff and crack) can also affect the TSEPs such as on-resistance, turn-on di/dt and turn-off delay time thus leading to large measurement errors.

SUMMARY

Embodiments according to the invention can provide methods of measuring real-time junction temperature in SiC power MOSFET devices using turn-on delay, related circuits, and computer program products. Pursuant to these embodiments, a method of measuring a junction temperature of a SiC MOSFET can be provided by applying a gate-source voltage to an external gate loop coupled to a gate of the SiC MOSFET, detecting a first time when the gate-source voltage exceeds a first value configured to disable conduction of a current in a drain of the SiC MOSFET, detecting, after the first time, a second time when a voltage across a common source inductance in a package of the SiC MOSFET indicates that the current in the drain is greater than a reference value, defining a time interval from the first time to the second time as a turn on delay time of the SiC MOSFET and determining the junction temperature for the SiC MOSFET using the turn on delay time.

DETAILED DESCRIPTION OF EMBODIMENTS ACCORDING TO THE INVENTION

Figure 1:
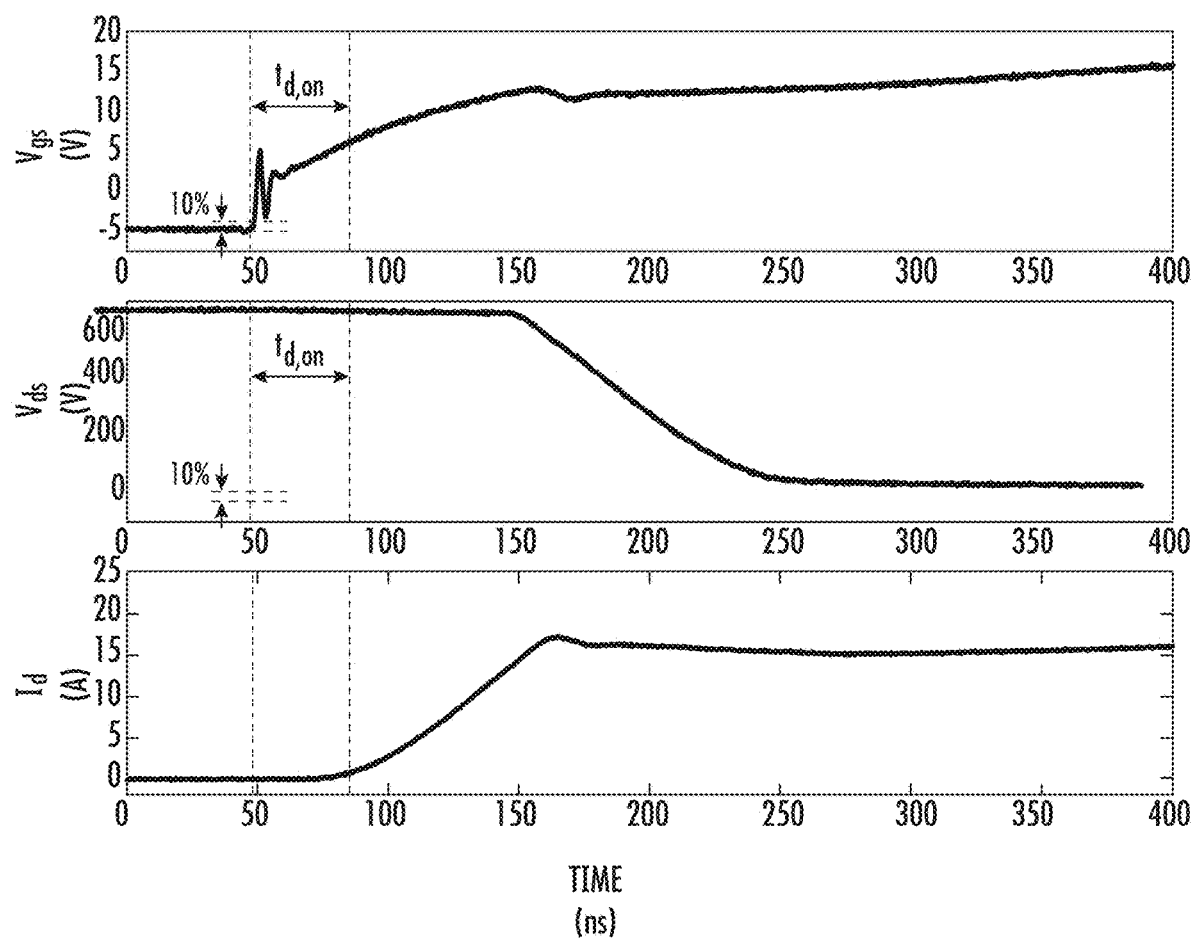
FIG. 1 is an illustration of the turn-on delay time during a switching transient.

Exemplary embodiments of the present disclosure are described in detail with reference to the accompanying drawings. The disclosure may, however, be exemplified in many different forms and should not be construed as being limited to the specific exemplary embodiments set forth herein. Rather, these exemplary embodiments are provided so that this disclosure will be thorough and complete, and will fully convey the scope of the disclosure to those skilled in the art.

As appreciated by the present inventors, turn-on delay time may be a favorable temperature sensitive electrical parameter in terms of its linearity, sensitivity, and load independence. In some embodiments according to the invention, for example, real-time junction temperature measurements for SiC MOSFETs may be provided by generating a pulse having a width that represents the turn-on delay of the SiC MOSFET. The width of the pulse can be generated by detecting the time that the SiC first begins to turn on via the gat-source voltage and the time the drain current begins to flow. The pulse can be shaped by generating two signal edges (one for each time described above) and using those signal edges to for the leading and trailing edges of the pulse that indicates the turn on delay. Further the SiC MOSFET can be driven by a gate driver circuit with an adjustable resistance (large/small) that can be selected based on the mode of operation. For example, a small resistance value can be used to drive the gate voltage when the SIC MOSFET operates in an application environment (such as a converter application) to reduce switching loss whereas the resistance can be changed to a larger value when the SiC MOSFET is operated to monitor the junction temperature in some embodiments so as to increase the accuracy of the measurement. In still other embodiments, the threshold voltage of the SiC MOSFET can be monitored over time so that measurement of the junction temperature can be made more accurate by compensating the measured junction temperature for aging that causes an increase in the threshold voltage.

As further appreciated by the present inventors, utilizing an adjustable gate resistance circuit, a high sensitivity of 600 ps/° C. can be achieved for turn on delay measurement. A Double Pulse Test (DPT) and buck converter was built to test the accuracy of the online junction temperature measurement method in both switching test and continuous operation. In those experiments, the circuit result compared to the IR camera measurement, it was validated that the proposed method can achieve an online real time junction temperature measurement with a measurement error of less than 1° C.

As used herein, the term "on-line" includes embodiments where the junction temperature of a monitored SiC MOSFET can be determined using a controller that is coupled to a gate driver circuit that operates the SiC MOSFET. Accordingly, the junction temperature can be determined by pausing operations of the SiC MOSFET in-situ and interrogating the SiC MOSFET via the driver circuit to measure the junction temperature and receive a response in the form of a signal at the controller, which can convert the signal to a junction temperature value within less than about 1 second using the command and response described above.

As described herein, the turn-on delay time is a temperature sensitive electrical parameter and can be expressed as:

$$T_{d,on} = R_g \cdot C_{iss} \cdot \ln\left(\frac{V_{cc} - V_{ee}}{V_{cc} - V_{th}}\right) \quad (1)$$

where Rg is the total gate resistance, Ciss is the input junction capacitance, Vcc and Vee are the positive and negative drive voltages of the gate drive circuit, respectively. Ignoring the internal gate resistance's change at different junction temperatures, the variation of turn-on delay time at different Tj due to the temperature effect on Vth. Also, once the Vth is defined, the turn-on delay time can be load-independent making it suitable for online measurement. In addition, as can be seen from (1), the sensitivity of this TSEP can be adjusted by changing the gate resistance's value.

To validate these benefits, a double pulse test circuit was constructed, and Td, on (Tdon), of a commercial SiC MOSFET was tested at different junction temperatures.

In the validation experiment, the device's junction temperature was controlled by a hot plate and calibrated through a temperature sensitive electrical parameter (TSEP). A negative drive voltage of −5 V was applied, and a commercial gate driver with high common-mode noise immunity was used. From the double pulse test setup, the device's gate voltage and drain current were measured. The turn-on delay was obtained from the oscilloscope measurement and is defined as the interval from the point when starts increasing to the instance the mean value of the drain current reaches 200 mA as indicated in FIG. 2.

Figure 2:
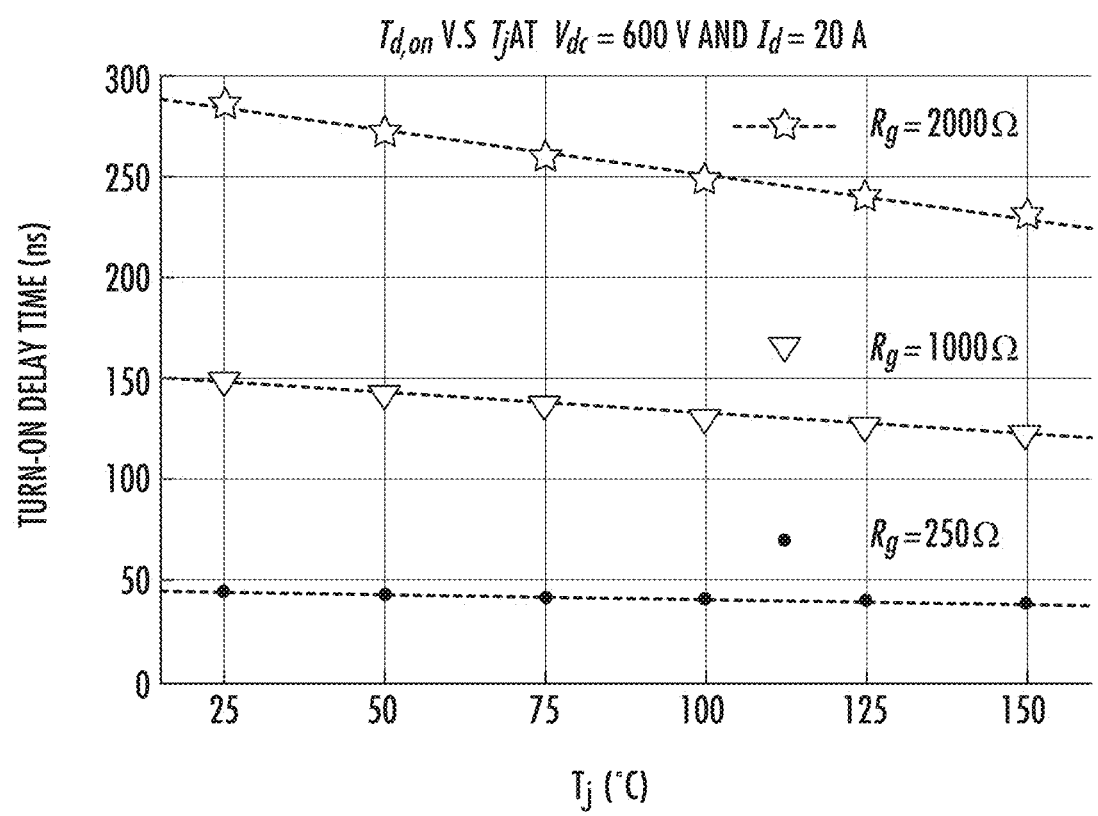
FIG. 2 is a graph of turn-on delay time variation over Tj at different external gate resistance.

FIG. 2 shows the experimental result of Tdon, versus Tj at different external gate resistances where the dc-link voltage was 600 V, and the load current was 20 A. It was observed that as Tj increased, the threshold voltage dropped linearly, and the turn-on delay time decreased accordingly. As further described herein the turn-on delay time may be improved by increasing the external resistance coupled to the gate of the SIC MOSFET. As summarized in the table, the sensitivity can increase from 48.4 ps/° C. to 432.1 ps/° C. when the gate resistance is increased:

| LINEAR FITTED PARAMETERS FOR $T_{d,on}$ V.S $T_j$ AT VARIOUS $R_g$ | | |
| --- | --- | --- |
| $R_g$ | Absolute value of the Slope | Values at 0° C. |
| 250 Ω | 48.4 ps/°C | 46.2 ns |
| 1000 Ω | 211.9 ps/°C | 153.6 ns |
| 2000 Ω | 432.1 ps/°C | 294.4 ns |

As appreciated by the present inventors and in view of the above, a turn-on delay measurement circuit for junction temperature measurement in real-time can be provided in some embodiments according to the invention. In particular, it can be seen from the above test that the turn-on delay time varies linearly with the junction temperature, and that the sensitivity can be made adjustable through the change of external gate resistance.

Figure 3:
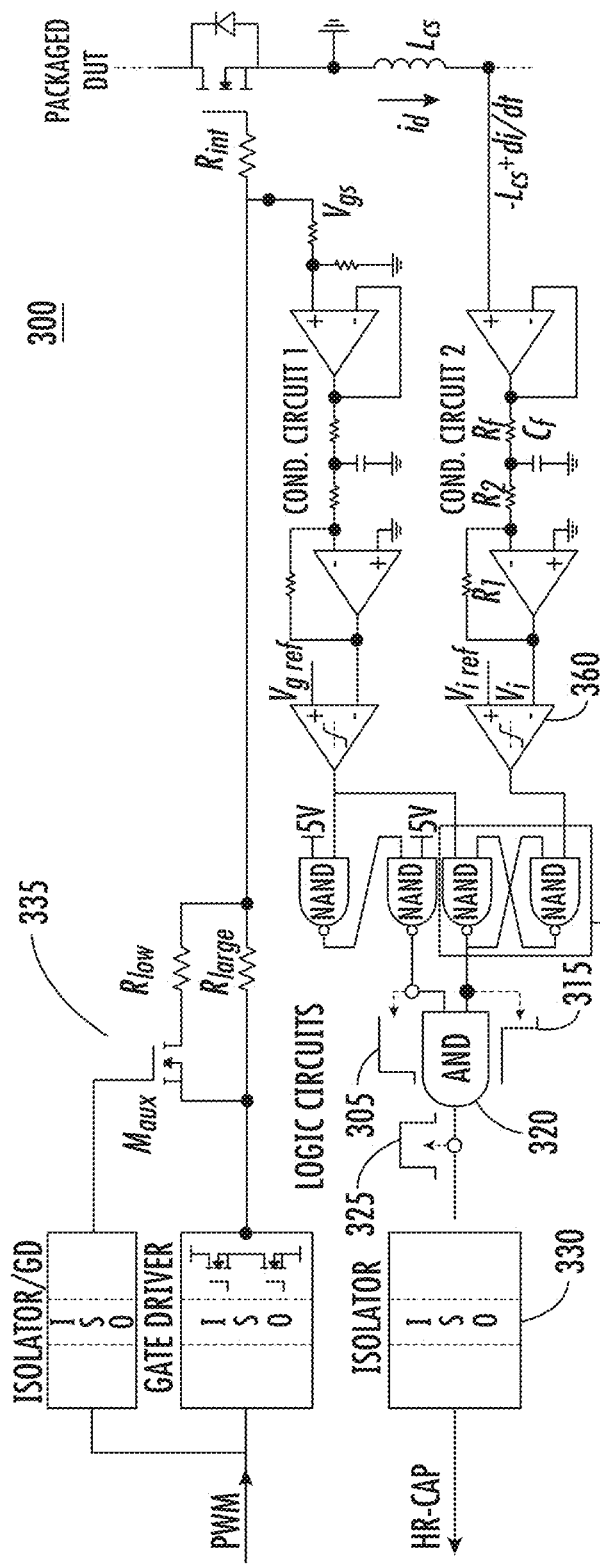
FIG. 3 is a circuit diagram of a turn-on delay time measurement circuit for Tj in some embodiments according to the invention.

FIG. 3 illustrates a circuit diagram of a circuit 300 configured to determine a turn-on delay time measurement and online junction temperature estimation. Specifically, the starting point of the turn-on delay period is indicated by the rising edge of the gate voltage as shown in FIG. 1. To capture this instant, as shown in FIG. 3 the gate voltage of the SiC MOSFETs is sensed and compared with a reference level using condition circuit 1 (also referred to as gate-source voltage detection comparator circuit). Once the gate voltage starts to rise and is equal to the reference value, the comparator output changes from low to high as indicated by the waveform 305 in FIG. 3. The ending point of the turn-on delay is represented by the rising edge of the drain current. To obtain this time instant, the common source inductance Lcs within the packaged device is utilized as indicated in FIG. 3. The Lcs can be the package's parasitic inductance between the kelvin source and power source for 4-pin TO packaged device or power modules in some embodiments. Alternatively, in some embodiments Lcs can be the self parasitic inductance of the source lead in a 3-pin TO packaged device.

When the device starts to commutate the load current, the drain current Id increases and flows through Lcs. Consequently, a voltage is generated across Lcs, and this Lcs di/dt voltage signal is sensed by the conditioning circuit 2 (sometimes referred to as a drain current detection comparator circuit). By comparing this analog signal with a proper reference value using comparator 360, the current rise stage can be captured. According to FIG. 3, the final current rise edge is indicated by a falling edge at the flip-flop 310 output as indicated by the waveform 315 in FIG. 3. The flip-flop 310 can improve the circuit's noise immunity as described herein.

These two waveforms (or signal edges) 305 and 315 signals (one rising edge capturing the beginning of turn-on delay and one falling edge representing the end of turn-on delay period) are input to the logical AND circuit 320, and the turn-on delay time can be represented by the width of the pulse 325 as illustrated in FIG. 3. The pulse 325 is transmitted to a system microcontroller through the digital isolator 330 with high common-mode noise immunity. The pulse width was calculated using the High-Resolution Capture (HR-Cap) module of a C2000 microcontroller from Texas Instruments to measure the turn-on time of SiC MOSFETs in some embodiments according to the invention. In some embodiments according to the invention, the turn-on delay time Tdon, can be accurately calculated using the HR-Cap module with a resolution of about 300 ps.

In addition, to ensure the measurement accuracy and sensitivity, a large gate resistance is preferred during the turn-on delay period. Thus, the gate drive circuit 300 can be modified using an adjustable gate resistance circuit 335. Accordingly, the external gate loop resistance's value can be adjusted by turning on/off the auxiliary switch Maux shown in FIG. 3. Specifically, Maux is on during normal operations of the circuit 300 and a low external gate resistance is used to reduce the switching loss of the SiC MOSFET. To measure the junction temperature of the device, the Maux switch is turned off, and a large external gate resistance Rlarge is switched to the gate during the measurement period. With a large external gate resistance, high sensitivity can be achieved. In some embodiments according to the invention, the sensitivity was about 432.1 ps/° C. for Rlarge. Considering the 300 ps resolution in the HR-Cap module, the measurement error of the junction temperature can therefore be less than about 1° C.

Once the junction temperature is obtained during the turn-on delay period, the gate resistance can be switched back to the normal value (Rlow) by turning on Maux. In this way, a low gate resistance value is used in the turn-on current rise and voltage falling periods where most of the switching loss can be generated. Consequently, the switching loss can be controlled during the measurement switching cycle, and the converter's normal operation may not be affected as Maux switches Rlow back to the gate. Afterward, Maux remains in on-state (low gate loop resistance) until receiving the next measurement command from the controller.

It will be understood that although discrete components are shown in FIG. 3, the condition circuits 1 and 2, logic circuits, and adjustable gate resistance circuits may be integrated into the gate driver IC in some embodiments. For example, a segment drive with adjustable gate resistance can be used to replace the external switch Maux and the gate resistors Rlow and Rlarge.

Figure 4:
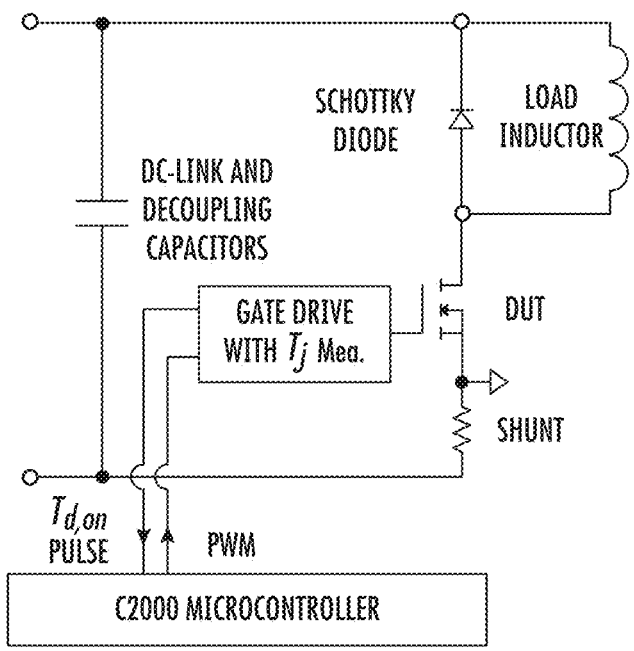
FIG. 4 is a circuit diagram of the double pulse test system.

To evaluate the methods, and circuits described herein, SiC MOSFETs were measured using circuits and methods according to the present invention. Specifically, both a double pulse switching test and a continuous operation were carried out. For the double pulse test (DPT), a setup was utilized to evaluate turn-on delay time measurement circuit for online Tj estimation. The circuit diagram of the DPT is shown in FIG. 4. The low-side SiC MOSFET is the device under test (DUT), and its drain current, drain-to-source voltage, and gate voltage are measured with high-bandwidth coaxial current sensor and passive voltage probes. A SiC Schottky diode is used in the high-side, and the power loop layout maximizes the device's switching performance. The decoupling capacitors are located close to the switching devices. The proposed online junction temperature measurement circuit is implemented to the low-side SiC MOSFETs together with its gate drive circuit. During the test, the controller sends the switching signals to the gate drive circuit and auxiliary switch. The turn-on delay pulse signal is sent back to the microcontroller's HR-Cap module for determination of Tdon in real-time as discussed herein.

In the condition circuits 1 and 2 shown in FIG. 3, a resistive divider and voltage follower are used in the first stage to adjust the analog signals (e.g. gate voltage) to an allowable voltage range of the op-amp as indicated in FIG. 3. It will be understood that the junction capacitance at the inputs of the op-amps should be carefully controlled. Otherwise the output of the op-amp may not follow the input gate signal timely, and this delay will cause a misalignment in the edge detection thus affecting the accuracy of turn-on delay time measurement.

Figure 5:
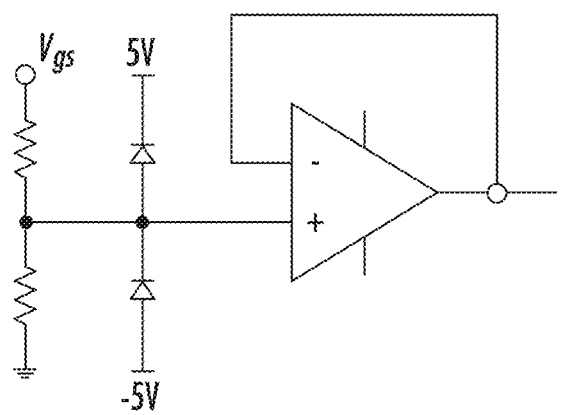
FIG. 5 is a circuit diagram of a resistor divider and voltage follower.
Figure 6:
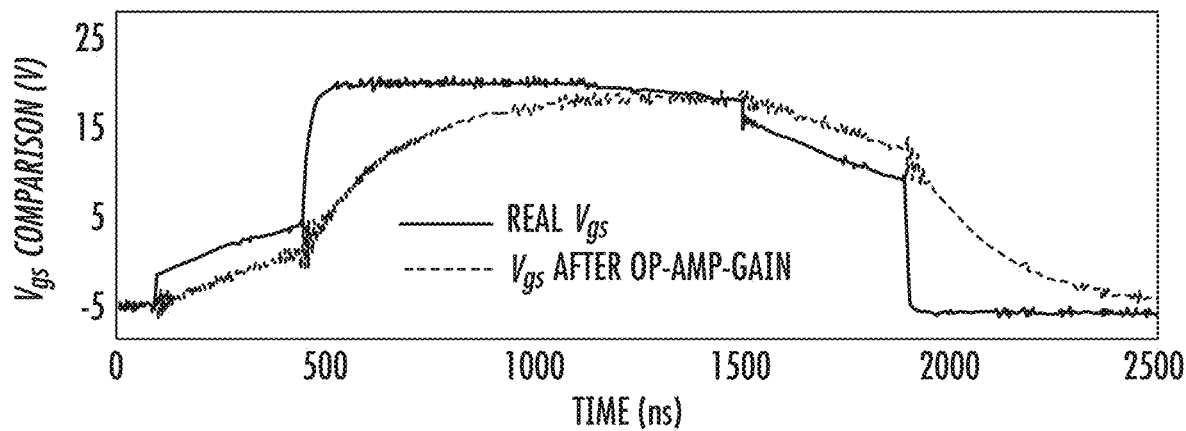
FIG. 6 shows a comparison of parasitic capacitance's impact on edge detection with protection diodes.
Figure 7:
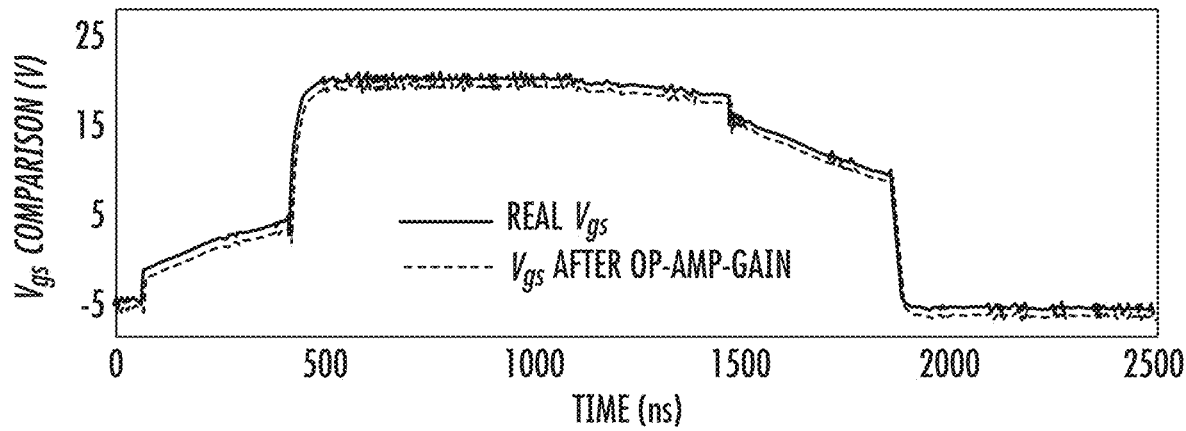
FIG. 7 shows a comparison of parasitic capacitance's impact on edge detection without protection diodes.

To verify this analysis, a comparison experiment was carried out on the DPT setup using the circuit of FIG. 5 including the protection diodes at the positive terminal of the op-amp shown therein. Specifically, the op-amp's output voltage waveforms were compared with and without the protection diodes as illustrated in FIGS. 6 and 7. As can be seen from FIG. 6, a low-pass filter effect is noticed with the protection diodes, and a large distortion is observed between the real gate signal and the op-amp's output. As a result, the edge detection for the start of turn-on delay is delayed thus leading to an incorrect turn-on delay time measurement. On the contrary, no deviation is found when the protection diodes were removed as indicated in FIG. 7. Therefore, it is should be noted to reduce the junction capacitance of the protection diodes and ensure signal integrity. In some embodiments according to the invention, the protection diodes can be eliminated, and the resistor divider can be properly designed to avoid over-voltages at the op-amp's input, as shown in FIG. 3.

Figure 8:
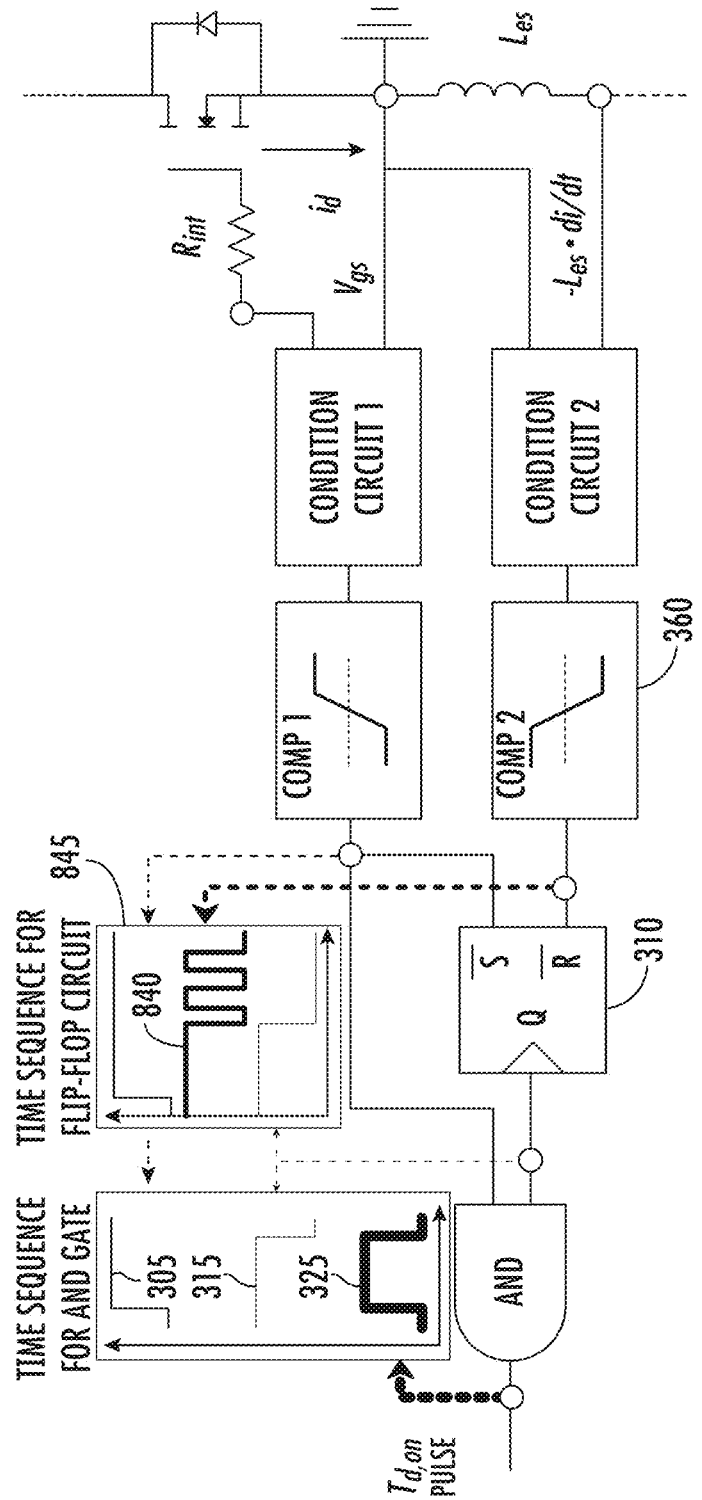
FIG. 8 is a detailed circuit diagram of a turn-on delay time measurement circuit for Tj in some embodiments according to the invention.

The noise immunity is another issue that can affect the performance of the junction temperature measurement circuit 300. In some embodiments, a large external gate resistance is used during the turn-on delay measurement period. Hence, the Lcs di/dt signal changes slowly and is compared to a reference for detecting the ending point of the turn-on delay period. However, the gate driver circuit can quickly switch to the low gate resistance value after the turn-on delay period in order to reduce the switching loss and to reduce the impact on converter operation. As a result, a ringing current may be generated in Id due to the power loop parasitic inductance and junction capacitance of the high-side device, and this ringing current can cause the Lcs di/dt signal to be noisy. For example, the ringing can cause the output of comparator 2 to bounce between the high and low outputs as indicated by the waveform in FIG. 840 in FIG. 8. If this signal were directly used with the rising edge signal (indicating the start of turn-on delay time shown in the orange waveform) in the AND gate, the final turn-on delay signal transmitted to the microcontroller may be unstable and may lead to a turn-on delay time that is inaccurate.

To address this issue, the flip-flop logic circuit 310 can filter the instability due to the ringing. In particular, the starting point of the turn-on delay period is derived by comparing the rising edge of the gate voltage to a reference and is represented by a rising edge at the comparator 1 output as shown by waveform 845 in FIG. 8. The comparator 1 output remains high during the turn-on period and it is coupled to the SET input of the flip-flop circuit 310. In contrast, the comparator 360 output (as indicated by the purple waveform) goes to the RESET pin. The flip-flop circuit 310 filters the changes in the output of comparator 2 that occur after the first falling edge output can trigger a reset in the flip-flop circuit's output. Thus, only one falling edge occurs at the flip-flop circuit 310 output as illustrated by the 325 waveform in FIG. 9, and it represents the end point of the turn-on delay time interval. This output signal is then used together with the comparator1's output to generate a pulse signal indicating the turn-on delay interval as shown in the waveform 325. In this way, the ringing induced noise does not affect the turn-on delay pulse signal and an accurate calculation of Tj may be determined. Other type of filter circuits may also be used.

Figure 9:
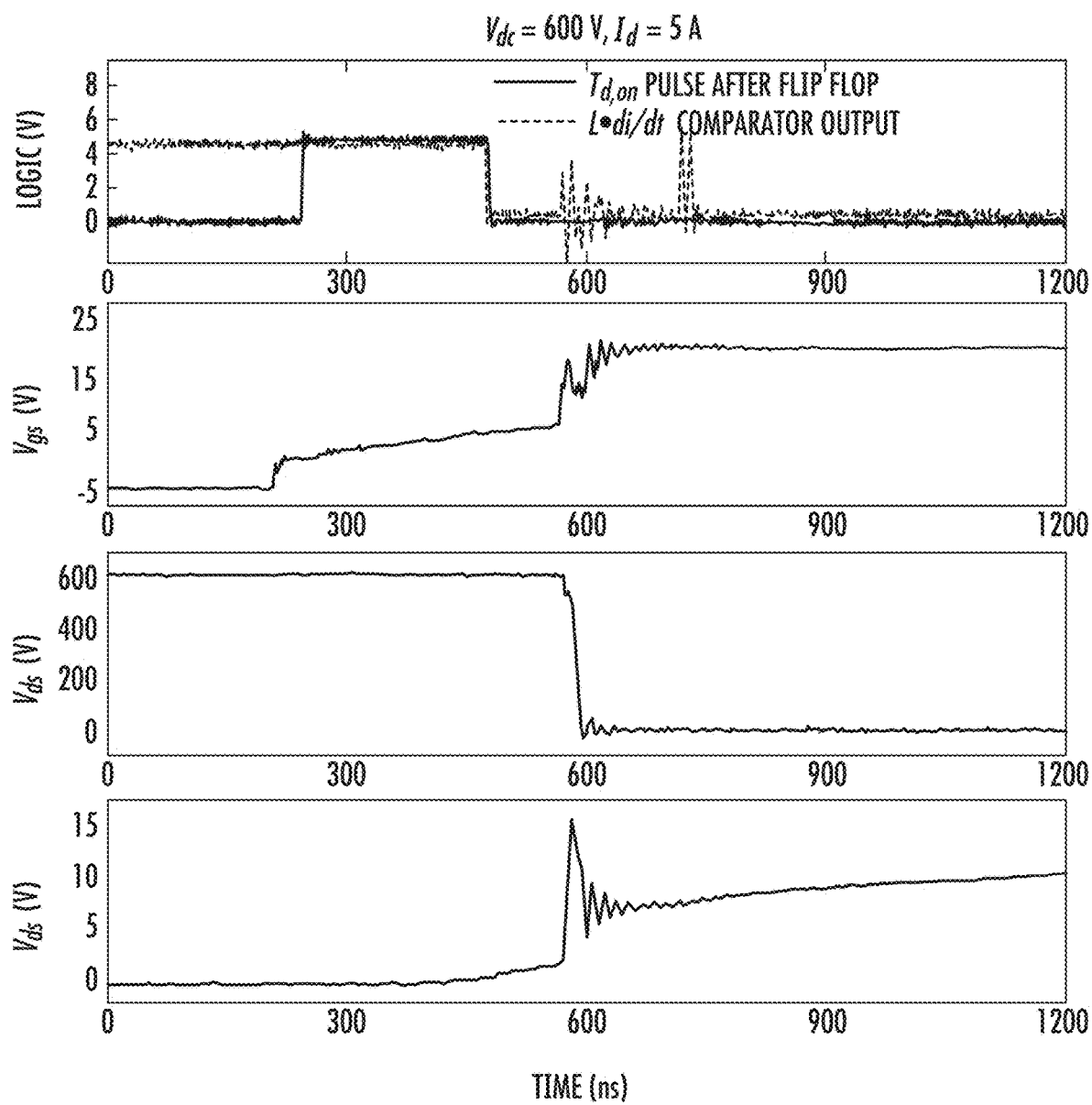
FIG. 9 shows a comparison of the logic output with and without flip-flop circuits in some embodiments according to the invention.

To validate the design, an experiment was carried out where the comparator 2 output and the final Tdon pulse signal was compared simultaneously in a hard switching condition. In the evaluation, the dc-link voltage was 600 V, the load current was 5 A, to generate the waveforms shown in FIG. 9. In this test, a large external gate resistance of 2000 Ω was initially used during the turn-on delay period. Then Rint was set to 10Ω, and a fast switching transient together with current ringing was observed. Consequently, comparator 2 output oscillated due to noise at the input Lcs di/dt signal as illustrated in FIG. 9. In contrast, with the implementation of the flip-flop circuit 310, the final turn-on delay pulse signal was not affected by the noise. Therefore, the flip-flop circuit 310 provided noise immunity in some embodiments according to the invention.

As further evaluation, commercial SiC MOSFETs were examined for online junction temperature measurement. The evaluations were performed using a double pulse test system, and the circuit and test setups shown in FIG. 4. To achieve an accurate setting of the device's junction temperature, the thermal resistance between the device and the hot plate was considered, and the temperature difference was compensated for. Specifically, the real Tj of the SiC MOSFET was derived from the body diode voltage at low current injection, and the hot plate's temperature setting was adjusted accordingly to achieve the desired junction temperature.

Figure 10:
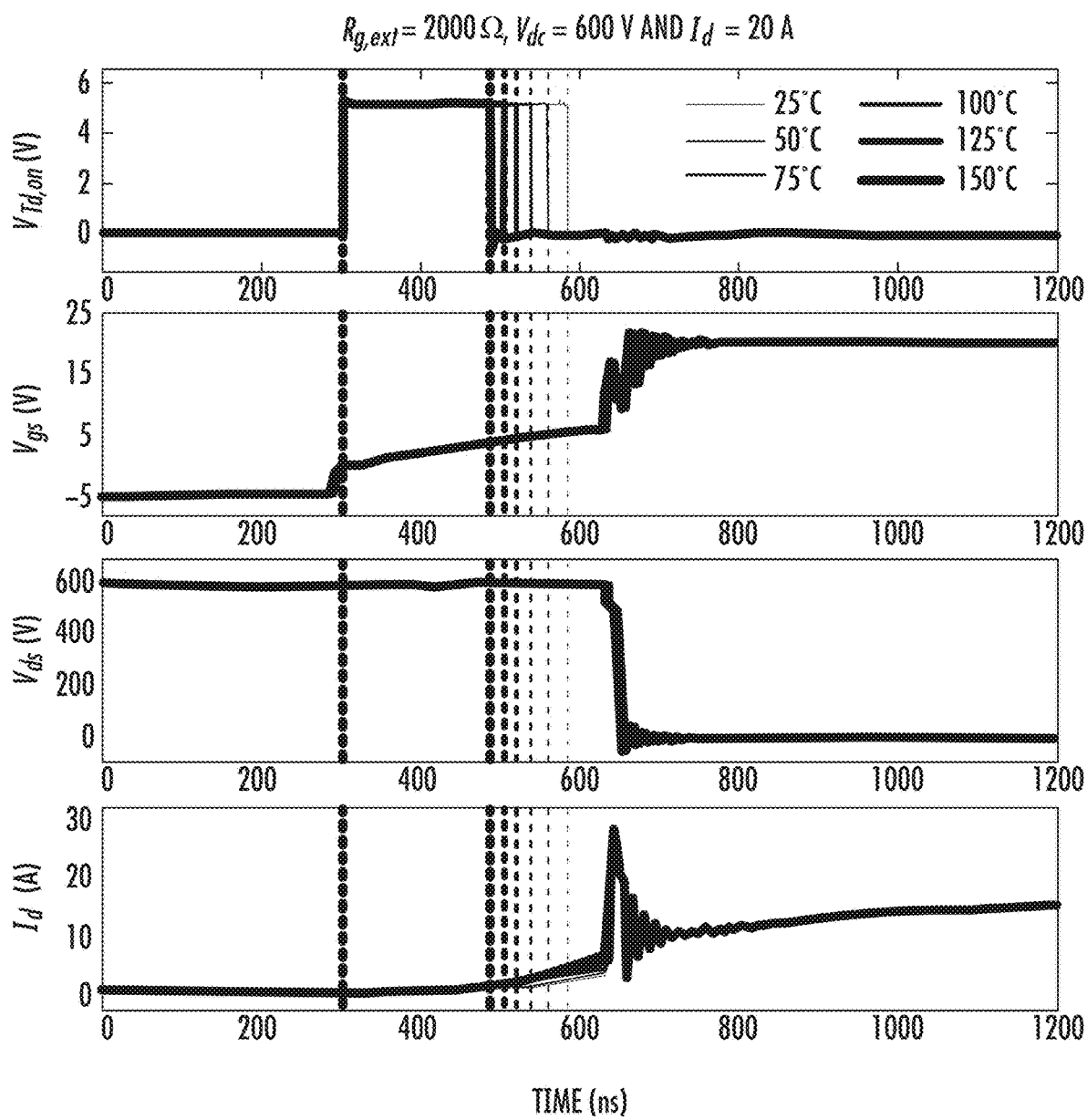
FIG. 10 show waveforms of the switching transient and turn-on delay pulse at a 5 A load current in some embodiments according to the invention.
Figure 11:
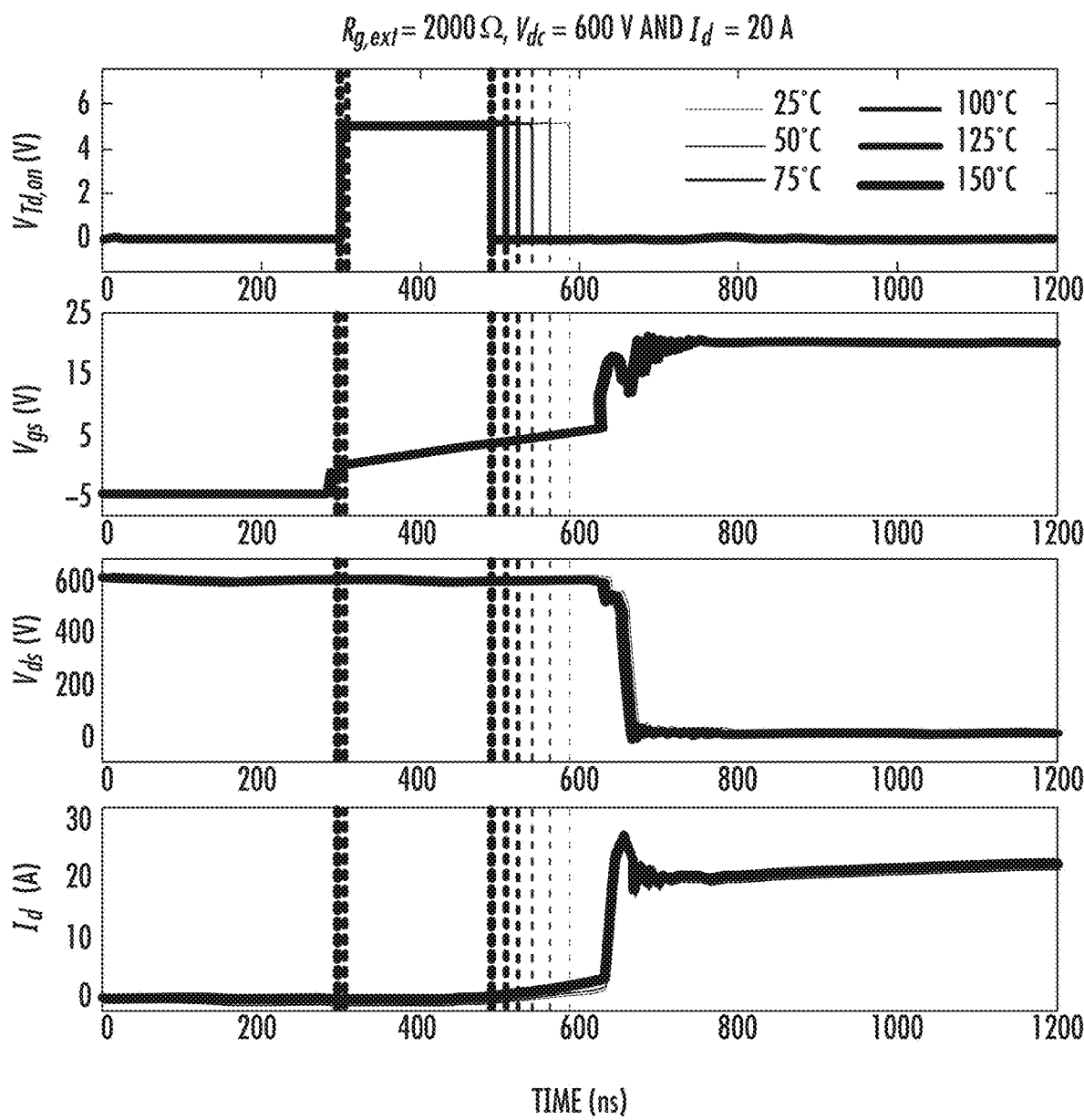
FIG. 11 show waveforms of the switching transient and turn-on delay pulse at a 20 A load current in some embodiments according to the invention.
Figure 12:
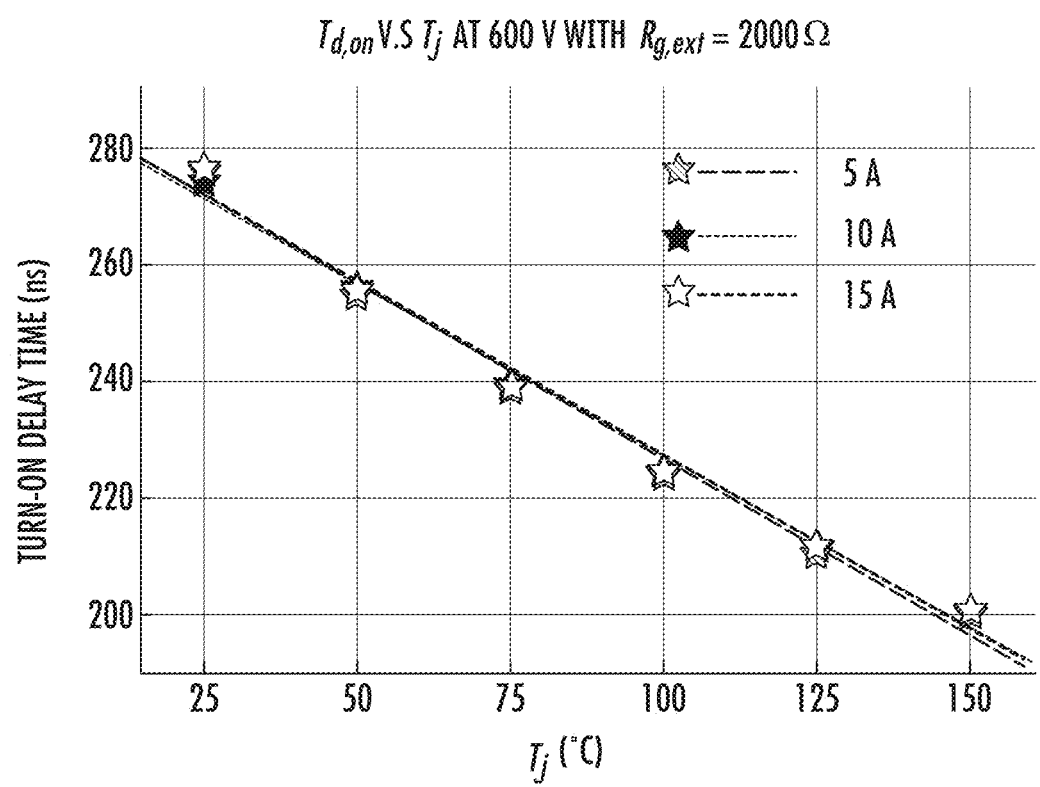
FIG. 12 are results of measured turn-on delay time at different Tj in some embodiments according to the invention.

Considering the low input capacitance (259 pF) of the specific SiC MOSFET, a large external gate resistance of 2000Ω was used during the turn-on delay period to improve the measurement sensitivity. FIG. 10 shows the experimental switching transient waveforms and the measured turn-on delay pulse signals at different Tj with a dc-link voltage of 600 V. The results at 5 A and 20 A are presented in FIGS. 10 and 11, respectively. It is observed that as the junction temperature increases, the device starts to commutate the load current earlier due to the threshold voltage decrease. Accordingly, the measured turn-on delay pulse is reduces as indicated in FIG. 10. The variation of the turn-on delay pulse signal was measured in the HR-Cap module. FIG. 12 summarizes the measurement results of Tdon at different junction temperatures.

As shown in FIG. 12, the measured turn-on delay time decreases with linearity as the junction temperature increases. In terms of sensitivity, for 1° C.'s temperature increase, the turn-on delay time decreases by about 600 ps. This variation was measured in the HR-Cap module with 300 ps resolution (corresponding to an accuracy of 0.5° C.). In addition, it was observed that the turn-on delay time variation over Tj remains the same as the load current changes. Therefore, the load information may not be required for online Tj measurement thus simplifying the implementation.

Figure 13:
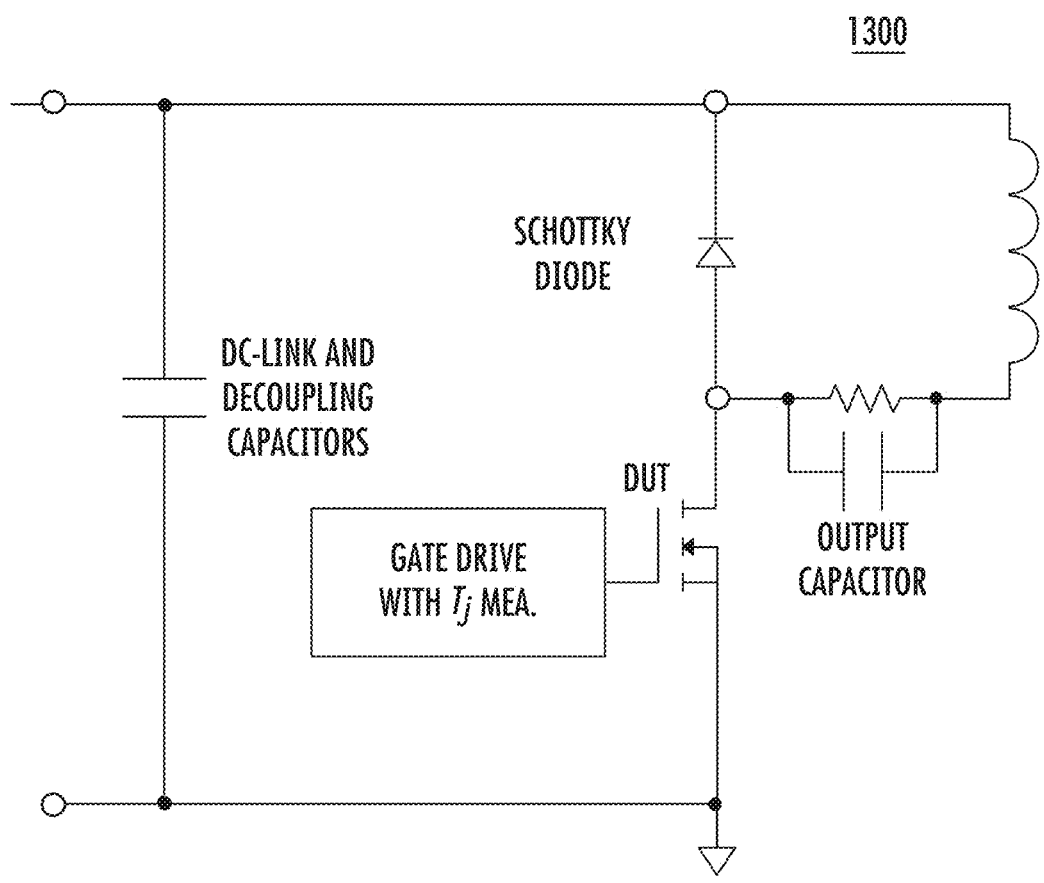
FIG. 13 is a circuit diagram of the set up for continuous operation.

The functionality and accuracy of circuits and method according to the present invention for online junction temperature measurement were also evaluated during converter operations of the SiC MOSFETs. Specifically, the DPT setup was modified to provide a buck converter circuit 1300 in FIG. 13 for evaluation of continuous operation. The low-side SiC MOSFET is still the hard-switching device while the high-side diode provides the freewheeling path. The detailed parameters of the buck converter are summarized in the following Table:

| CONVERTER PARAMETERS | |
|---|---|
| Parameters | Values |
| Switching Frequency | 200 kHz |
| Inductor | 650 µH |
| Output Capacitor | 180 µF |
| Load Resistor | 21 Ω at room temperature |

The device under test was modified to be accessible for Tj measurement from the infrared (IR) camera and the IR measurement result was used as a reference to validate operations. Specifically, the device was partially decapsulated to expose the die without affecting the electrical package interconnections. Then the die surface was painted black, and the emissivity of the IR camera was adjusted to ensure a precise Tj measurement. During steady-state converter operation, the IR camera measurement result can represent the device's real junction temperature. The estimated Tj from the turn-on delay measurement circuit was then compared with the IR measurement.

Figure 14:
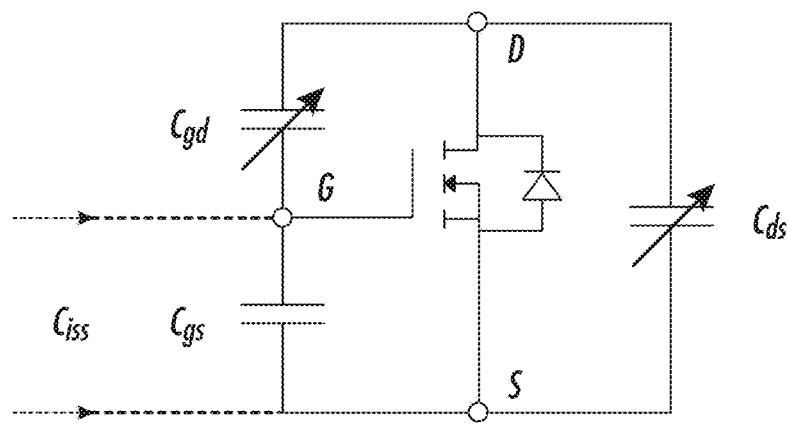
FIG. 14 is an illustration of parasitic capacitances within the SiC MOSFETs.

Since the package of the device was decapsulated for IR measurement, the breakdown voltage of the SiC MOSFET decreased. Hence, to ensure the safe operation of the device, the dc-link voltage was reduced to 100 V in continuous operations. As the dc-link voltage dropped, the input capacitance Ciss increased due to the nonlinearity of the junction capacitance. In particular, FIG. 14 shows the parasitic capacitances inside the SiC MOSFETs. The gate-to-source capacitance Cgs is in parallel with the series connection of gate-to-drain capacitance Cgd and drain-to-source capacitance Cds, and the input capacitance can be expressed as:

$$C_{iss} = C_{gs} + \frac{C_{gd} \cdot C_{ds}}{C_{gd} + C_{ds}} \quad (2)$$

The gate-to-source capacitance originates from the gate oxide material in between the gate metallization and doping material in the source, and it remains constant as the gate-to-source voltage varies. However, Cgd and Cds (the junction capacitances within the device's pn junction) values change according to the applied voltage: the junction capacitance decreases as the voltage increases. When the dc-link voltage was reduced from 600 V to 100 V, both Cgd and Cds increased. Accordingly, the input capacitance increases. The increase of Ciss causes the turn-on delay time to rise according to (1). Therefore, before the continuous operation test, the turn-on delay time's variation over Tj was re-calibrated in the DPT test at a dc-link voltage of 100 V, and the result is shown in FIG. 16.

Figure 15:
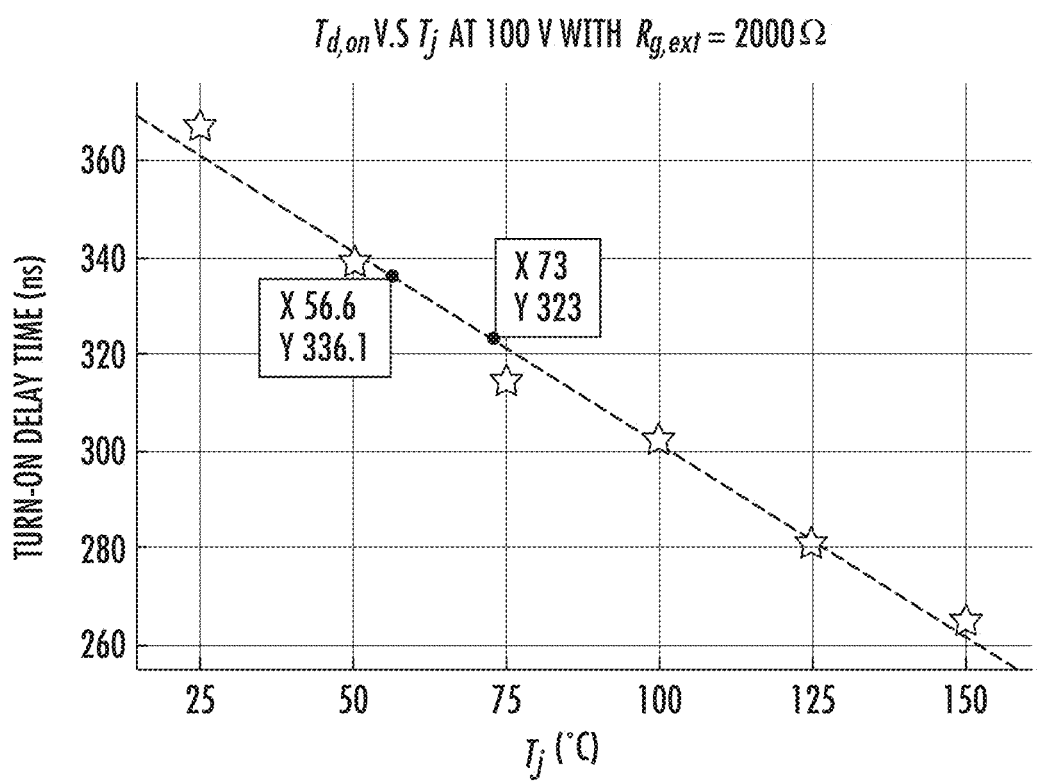
FIG. 15 are results of measured turn-on delay time versus Tj at dc-link voltage of 100 V in some embodiments according to the invention.

Similar to the previous DPT result at 600 V, a large Rgext of 2000Ω was used during the turn-on delay measurement phase. Good linearity was observed from FIG. 15, and the absolute value of Tdson increased compared to the 600 V results in FIG. 12. In addition, as the input capacitance increased, the sensitivity also improved according to (1). From the experimental result in FIG. 15, the sensitivity increases to 796.5 ps/° C. at a dc-link voltage of 100 V.

With the calibration curve, the device's junction temperature was measured in real-time using the circuits and methods described herein and the results were compared with the IR measurement for verification. In addition to these Tj measurements, the inductor's current Il was measured by the TCP0030A current probe during the continuous operation. The DUT's gate-to-source voltage Vgs, drain-to-source voltage Vds, turn-on delay pulse signal Tdon, and the gate signal for the auxiliary switch Vgs_aux were recorded as well.

Figure 16A:
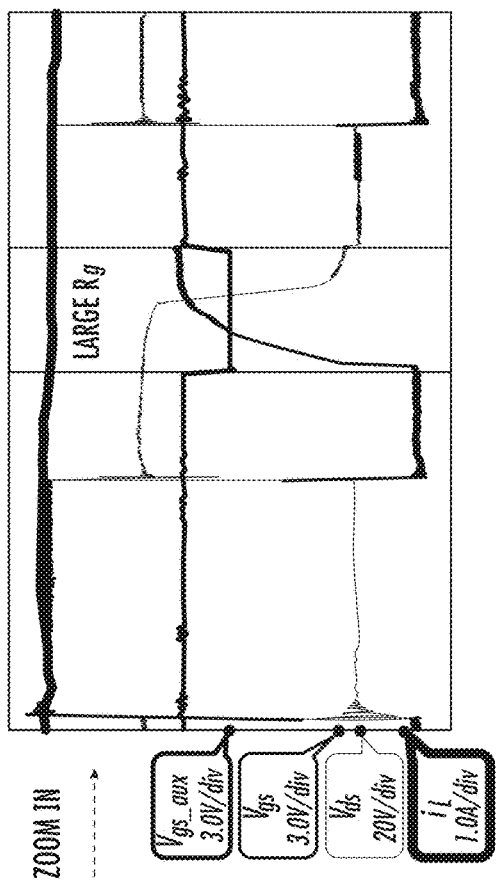
FIGS. 16A and 16B illustrate continuous operating waveforms at a steady-state of 100 V/8.2 A in some embodiments according to the invention.
Figure 16B:
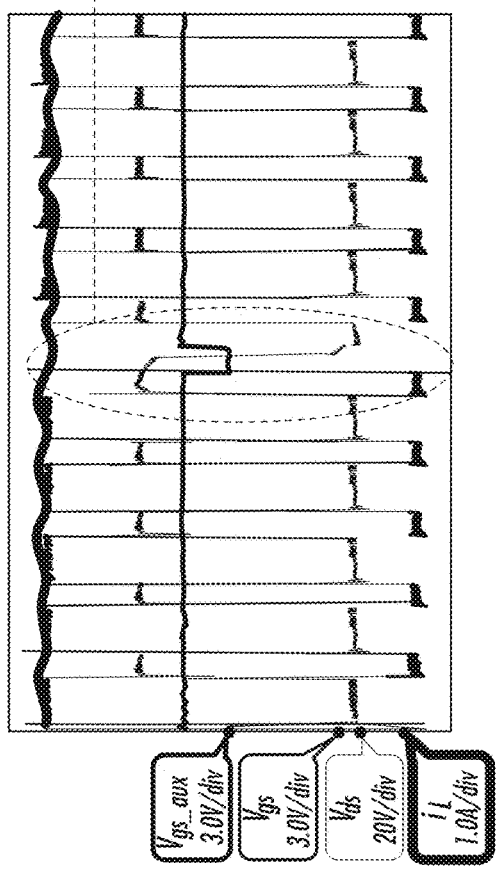

FIGS. 16A and B illustrate the steady-state continuous operation waveforms captured from the oscilloscope at a load current of 8.2 A. As can be seen, the auxiliary switch's gate signal Vgs_aux remained high in normal converter operation and a low gate resistance is used to reduce the switching loss. With low gate resistance, the ringing is observed in Vgs and Vds and the fast-switching transient enables the SiC MOSFET to operate at 200 kHz. At the intervals of the continuous operation, the junction temperature was measured as indicated in the zoom-in waveform of FIG. 16B. In each measurement switching cycle, the gate signal of the auxiliary switch sets to low at the beginning for a large gate resistance to improve the measurement sensitivity based on Tdon. Once the junction temperature is obtained, the auxiliary switch immediately turns off, and the converter resumes the normal operation within one switching period.

Figure 17A:
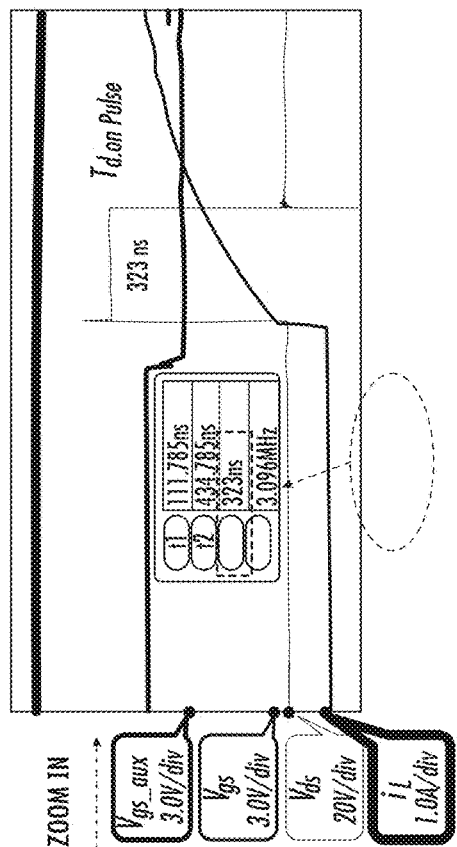
FIGS. 17A and 17B illustrate continuous operating waveforms and turn-on delay pulse signal at a steady-state of 100 V/8.2 A in some embodiments according to the invention.
Figure 17B:
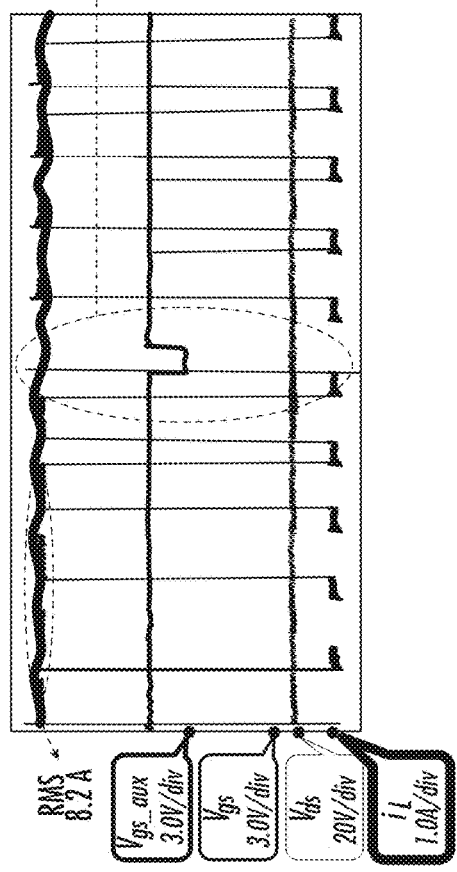

At the same operating condition (100 V dc-link with a load current of 8.2 A), the continuous waveforms together with the turn-on delay pulse Tdon signal are shown in FIG. 17A-B. As indicated in the zoom-in waveform of FIG. 17B the oscilloscope's cursor is utilized to indicate the pulse width of Tdon and the turn-on delay time was measured to be 323 ns. Referring to the turn-on delay versus Tj relationship shown in FIG. 15, a junction temperature of 73.0° C. was derived in real-time converter operation.

Figure 18:
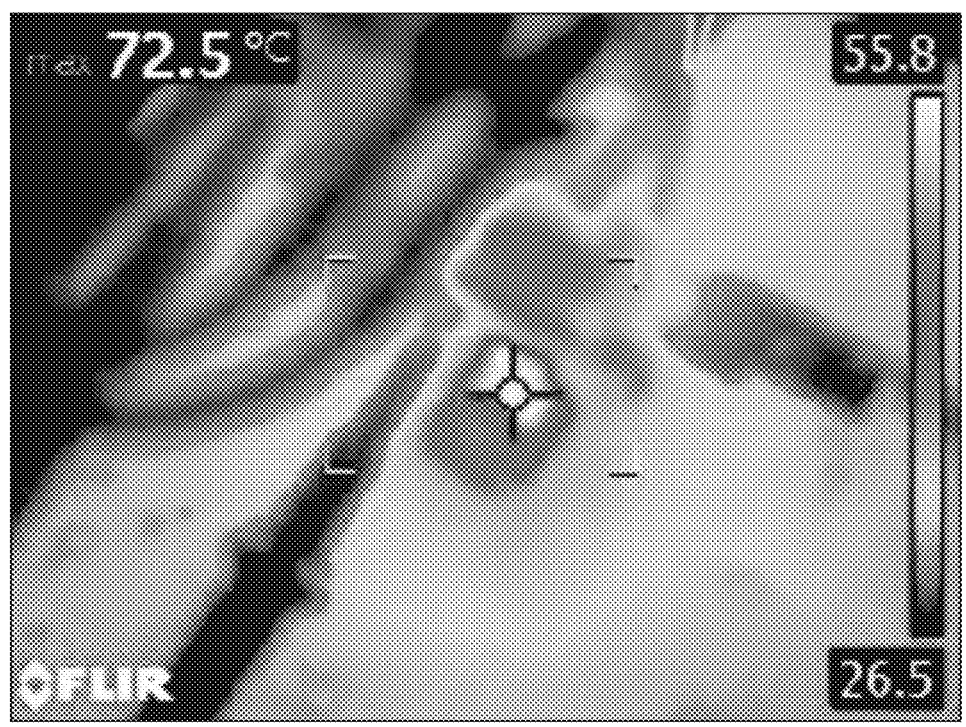
FIG. 18 is am image of an IR measurement result at a steady-state of 100 V/8.2 A in some embodiments according to the invention.
Figure 19:
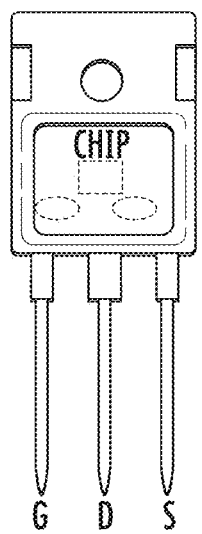
FIG. 19 is an image of a decapsulated device for Tj measurement from an IR camera.

The IR camera measurement at the same instant is shown in FIG. 18. A maximum junction temperature of 72.5° C. was observed in the center of the die. Considering the small die size of this low-current SiC MOSFET, a uniform temperature distribution is expected for this specific device. Consequently, the mean junction temperature of the device is close to the maximum junction temperature. Comparing the circuit measurement (73.0° C.) to the IR result (72.5° C.), a small Tj difference is observed. Hence, the accuracy of the proposed junction temperature measurement circuit was validated experimentally. In addition to the results shown in FIG. 16 to FIG. 18, the experimental measurements from IR camera and the online estimation circuit are also compared in a recorded video.

Figure 20:
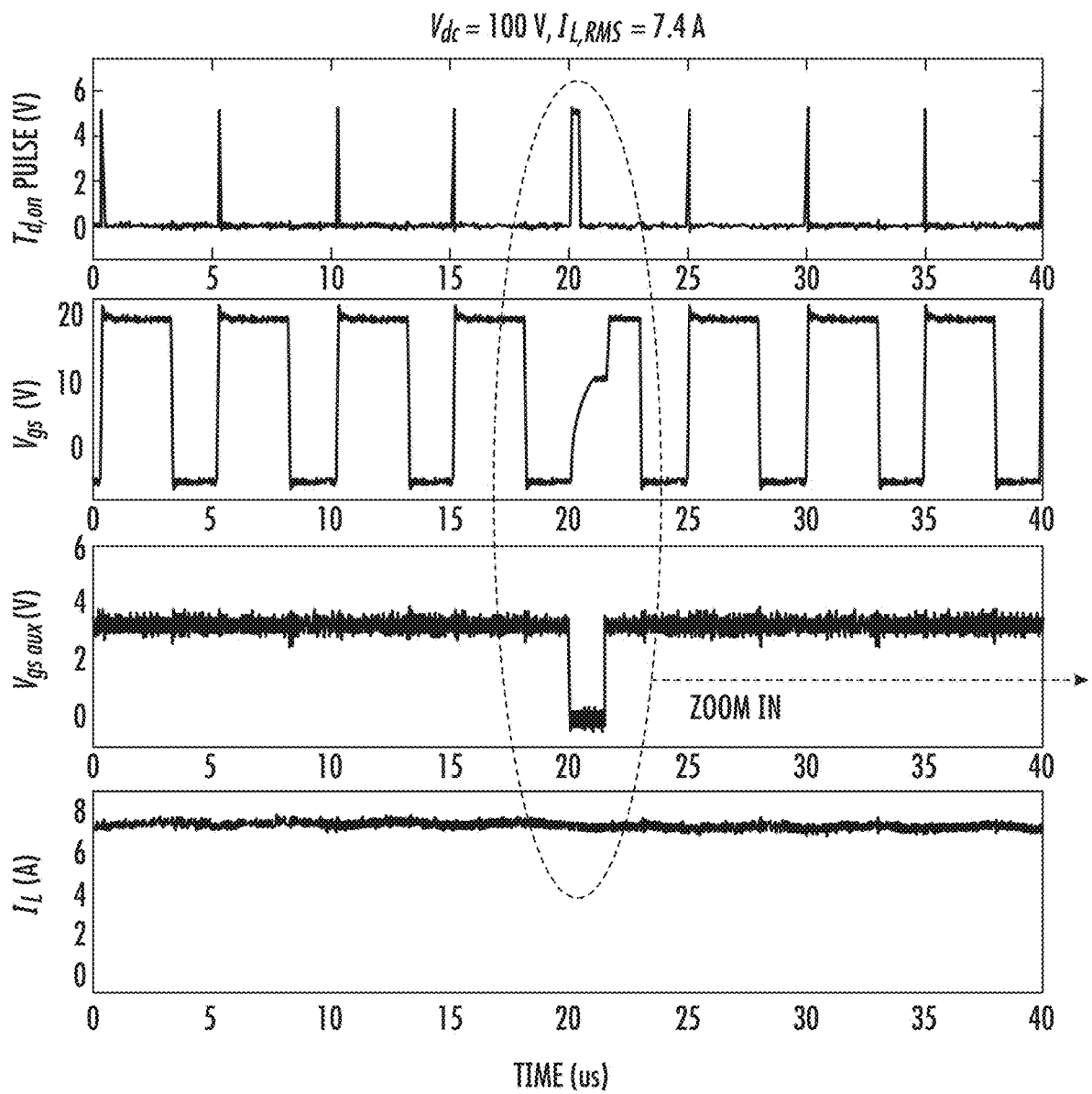
FIGS. 20 and 21 show verification of measurement accuracy at another operating point of 100 V/7.4 A in some embodiments according to the invention.
Figure 21:
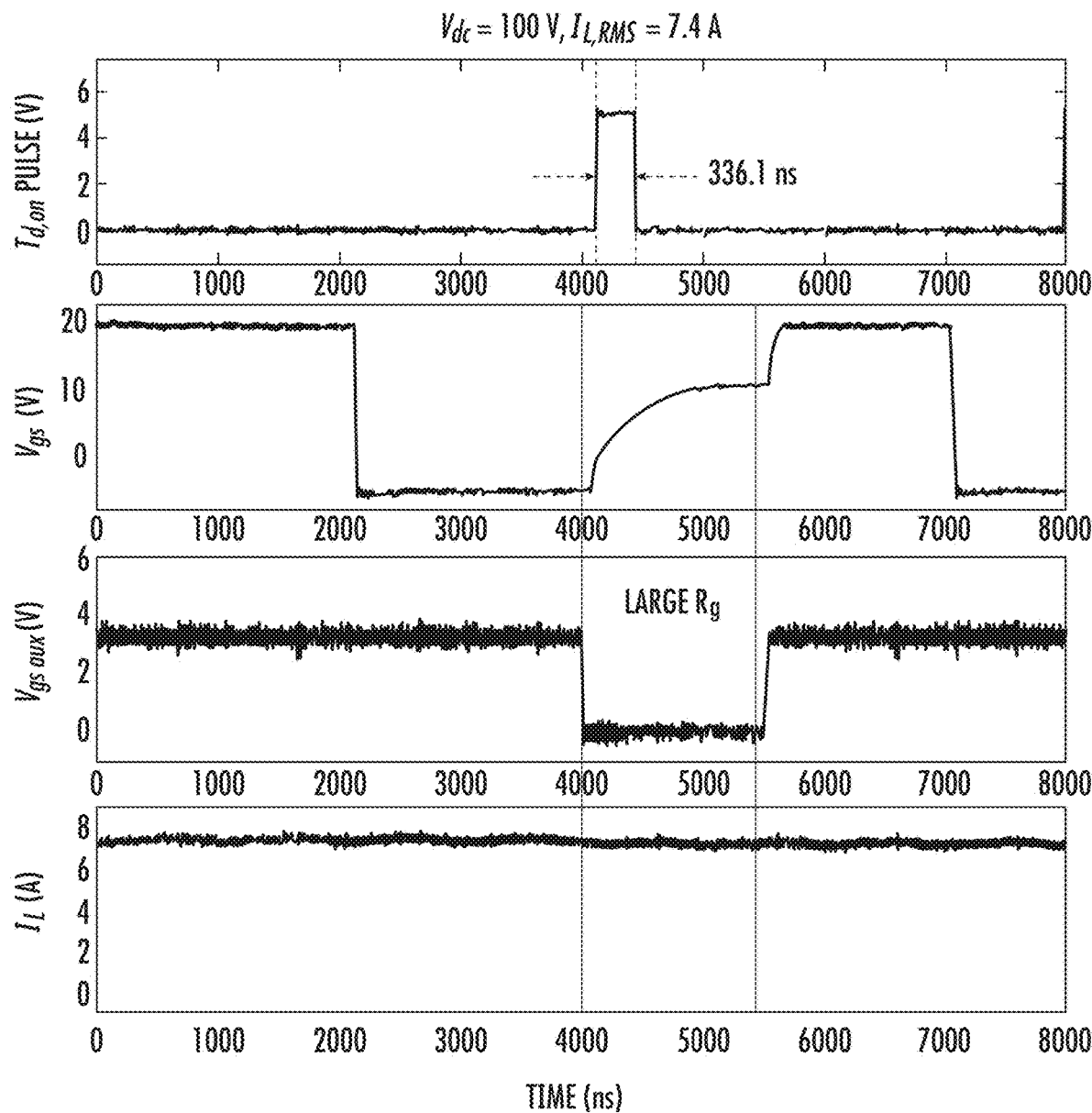
Figure 22:
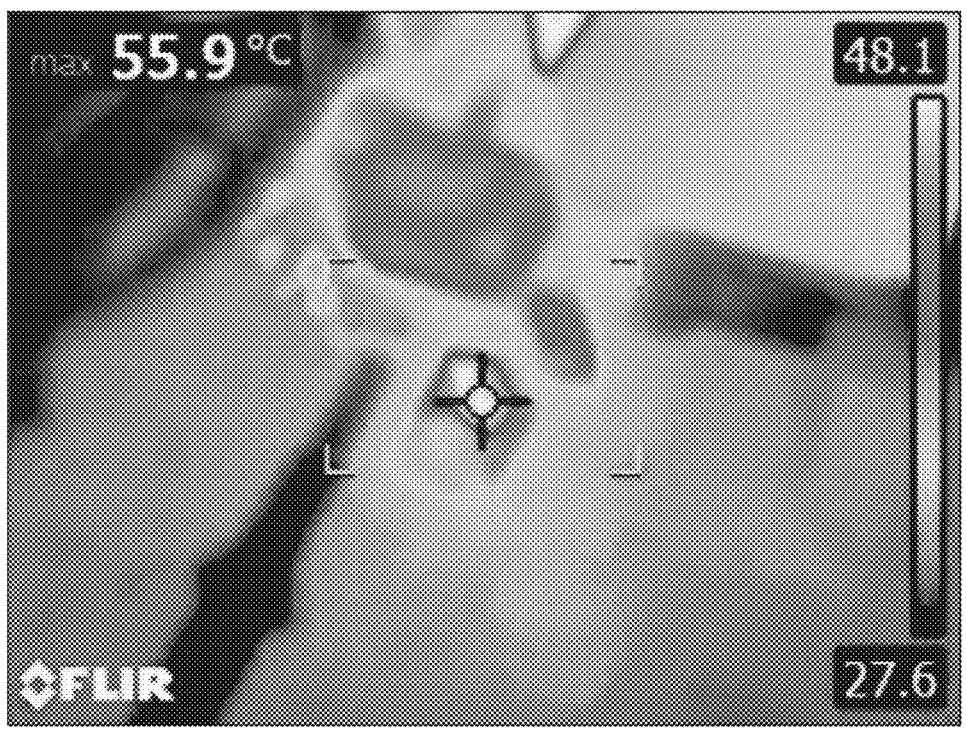
FIG. 22 is an image of an IR measurement result at a steady-state of 100 V/7.4 A in some embodiments according to the invention.

The measurement accuracy of the proposed circuit was also evaluated at an operating condition where the load current was reduced to 7.4 A, and the steady-state experimental waveforms are plotted as illustrated in FIGS. 20 and 21. At a lower Il the junction temperature decreased, and the measured turn-on delay pulse increased to 336.1 ns. According to the calibration curve shown in FIG. 15, a junction temperature of 56.6° C. is obtained. On the other hand, the device's realTj is measured to be 55.9° C. from the IR camera as indicated in FIG. 22. As can be seen, the results match well, and the accuracy of the proposed online Tj measurement method is validated at different operating conditions.

As discussed previously, the device's aging can affect the TSEPs making the junction temperature measurement unreliable over the aging process, if unaddressed. As appreciated by the present inventors an aging compensation scheme can be applied to the Tdon based online junction temperature measurement.

For many SiC MOSFETs, a high density of traps can exist in the SiC/SiO2 interface due to the vacancies and carbon atoms. Together with the reduced bandgap offset between SiC and SiO2, electrons can tunnel into the gate oxide under the long-term gate bias thus leading to the threshold voltage shift. Therefore, considering the repetitive gate bias stress during long-term converter operation, a permanent change in Vth can occur over aging. As a result, the turn-on delay time may be shifted according to (1), and the Tj estimated from Tdon may become inaccurate.

Figure 23:
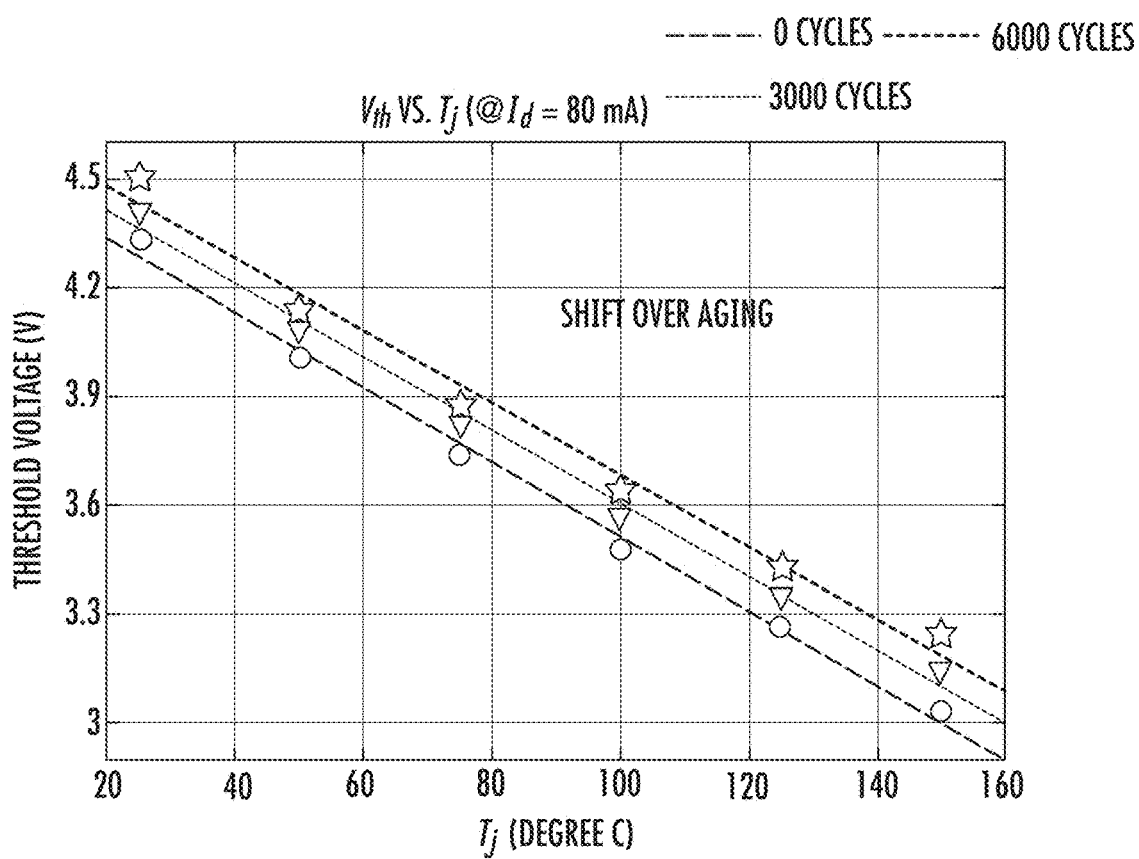
FIG. 23 is a graph of threshold voltage shift over aging at different Tj in some embodiments according to the invention.

FIG. 23 shows experimental results of the threshold voltage shift over aging for a SiC MOSFET. The selected fresh device had the same part number and batch code as the previous evaluated DUT. In the aging test, the DC power cycling method was implemented. Specifically, the device was heated by its own conduction loss, and the nominal on-state voltage (20 V in this case) was constantly applied to stress the gate oxide of the device. Once the device's junction temperature reached the maximum Tj setting, the device was turned off with zero gate bias. Consequently, the load current was removed, and the device started to cool down to the minimum Tj setting.

At intervals of the aging test, the threshold voltage of the device was characterized 5 hours after the gate bias stress. The measurement delay ensured that the interface traps had achieved the equilibrium state, and only the permanent shift of Vth due to the near-interface trap was measured. As can be seen in FIG. 23, at various junction temperature, a positive bias temperature instability (PBTI) was observed as the gate voltage varied between 20 V and 0 V. At different aging cycles, the variations of the Vth versus Tj curve are summarized in the Table below:

| LINEAR FITTED PARAMETERS FOR $V_{th}$ V.S $T_j$ AT DIFFERENT AGING CYCLES | | |
|---|---|---|
| Aging Cycles | Sensitivity | Values at 0 °C. |
| 0 | −10.3 mV/°C | 4.54 V |
| 3000 | −10.0 mV/°C | 4.61 V |
| 6000 | −9.9 mV/°C | 4.68 V |

Figure 24:
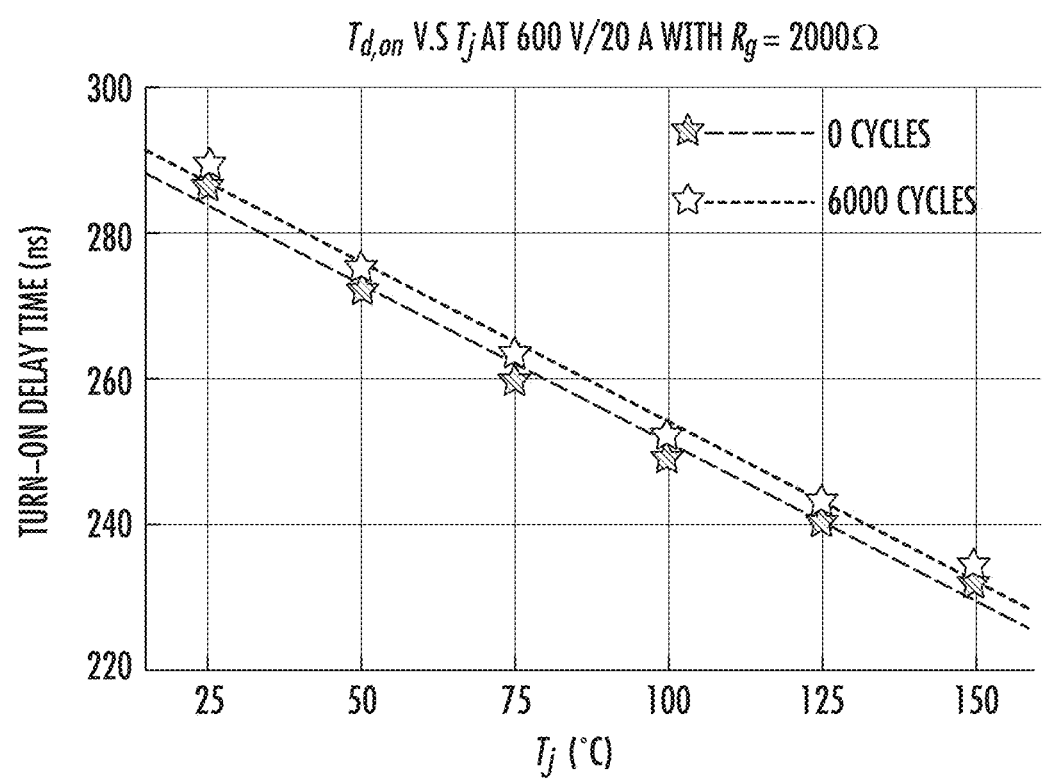
FIG. 24 is a graph of turn-on delay time variation over aging at different Tj.

It is observed that the sensitivity remains almost the same after aging. However, an offset is noted due to the positive threshold voltage shift (~3.08%). Due to the threshold voltage shift, the turn-on delay time is also affected after the gate oxide degradation. Utilizing the DPT setup discussed in with reference to FIG. 1, the experimental result of the Tdon variation over aging at different Tj is summarized in FIG. 24. As can be seen, the turn-on delay time does go up due to the positive Vth shift induced in the DC power cycling test, but the slopes of the fitted curves remain the same. In terms of aging's effect on Tj measurement, the positive shift of the Tdon versus Tj curve causes an underestimation of the device's real junction temperature, and the measurement error reaches about 8° C. at 6000 aging cycles. The aging test was stopped at 6000 aging cycles because of the device's package failure under large temperature swings. In real applications, the gate bias stress time can be longer, and a larger Vth shift is expected. Consequently, the Tj measurement error based on turn-on delay time can be more severe after aging, and the result is lower than the device's real junction temperature. The underestimation of the device's real Tj is undesirable since the over-temperature in the device can bring reliability issues or cause device failures.

Figure 25:
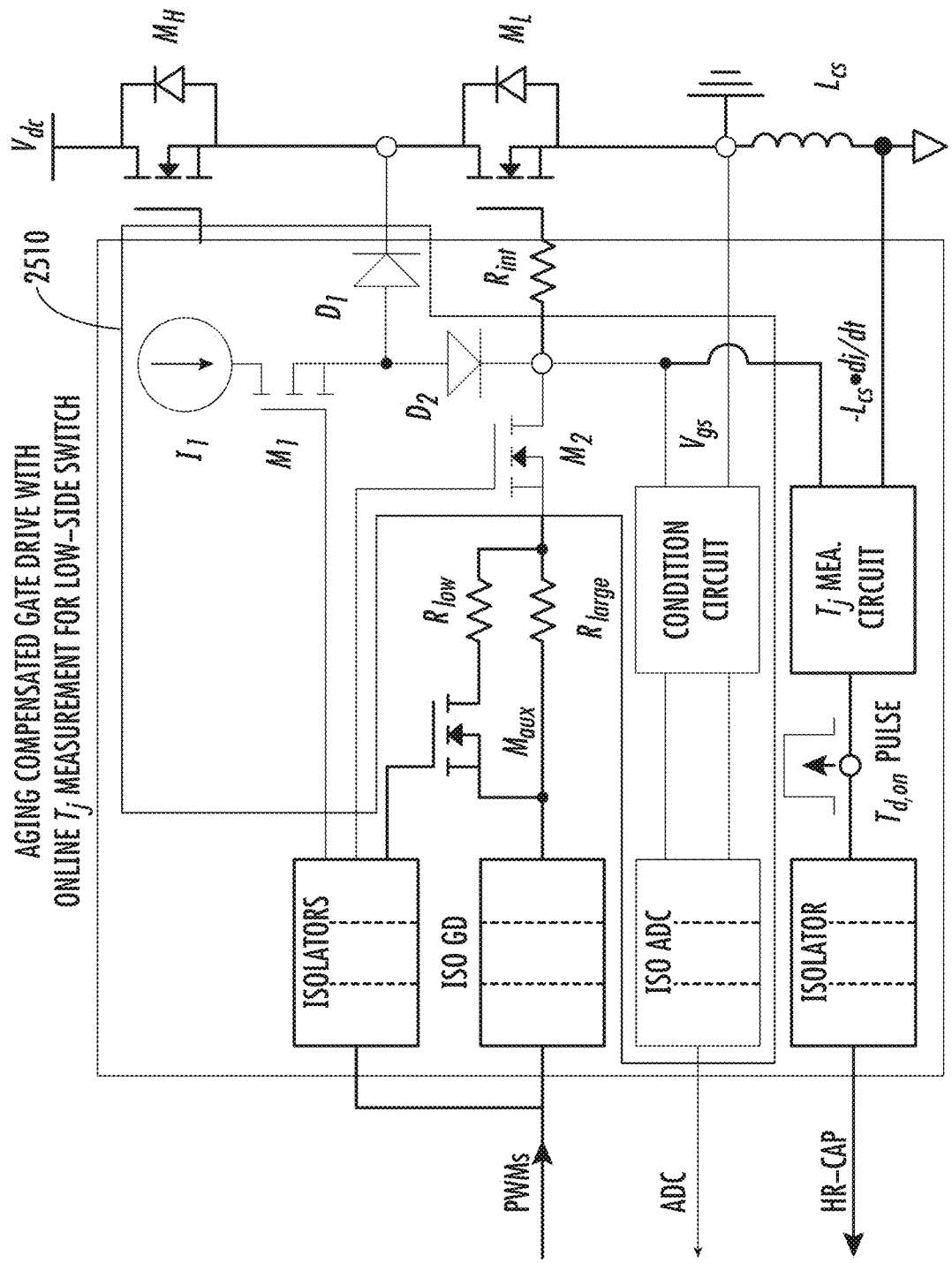
FIG. 25 is a circuit diagram of an aging compensation circuit for inclusion with the circuit of FIG. 3 in some embodiments according to the invention.
Figure 26A:
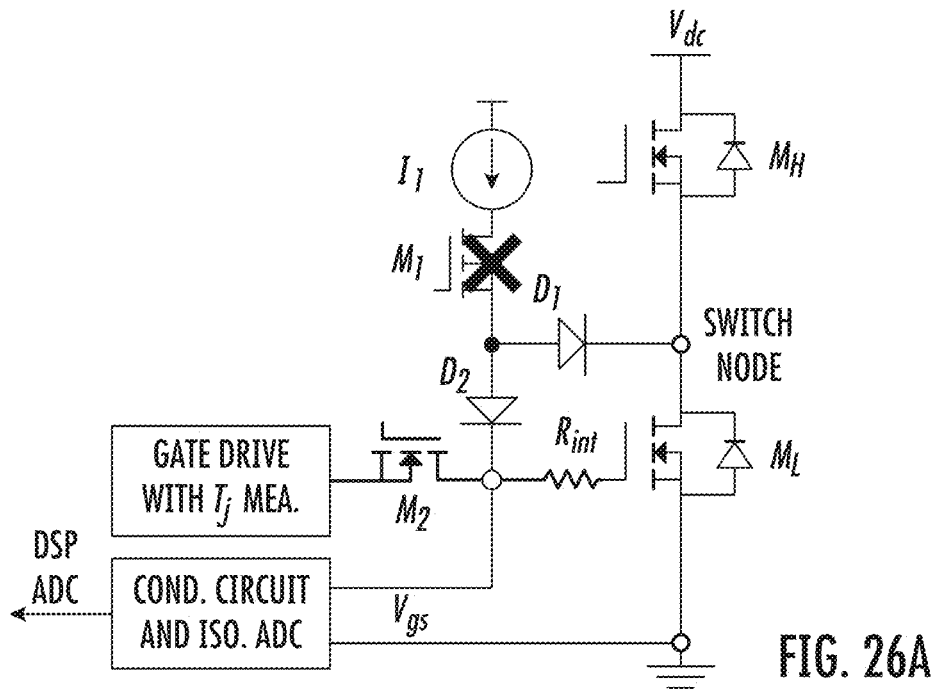
FIGS. 26A and 26B are circuit diagrams showing operation of the aging compensation circuits of FIG. 25 during normal converter operation and during threshold voltage measurement operation, respectively, in some embodiments according to the invention.

As appreciated by the present inventors, to achieve a consistent and accurate junction temperature measurement over the device's lifetime, an aging compensation circuit can be added to the gate drive circuit in some embodiments according to the invention. The circuit 2510 is highlighted by the dashed lines in FIG. 25. As shown in FIG. 25, the circuit 2510 includes a current source 1, two diodes D1 and D2, two control switches M1 and M2, one isolated ADC and is coupled to the Condition circuit 1. During the converter normal operation, M1 is turned off, and no current is injected from the constant current source circuit Il as indicated in FIG. 26A. At the same time, M2 is in on-state, and the gate drive circuit functions normally to turn-on/off the SiC MOSFETs. A high-voltage Schottky diode is used for D1 to protect the threshold voltage measurement circuit from the high voltage in the middle-point of the phase leg, and a diode D2 with low junction capacitance is selected to mitigate its impact on the DUT's switching loss.

Figure 26B:
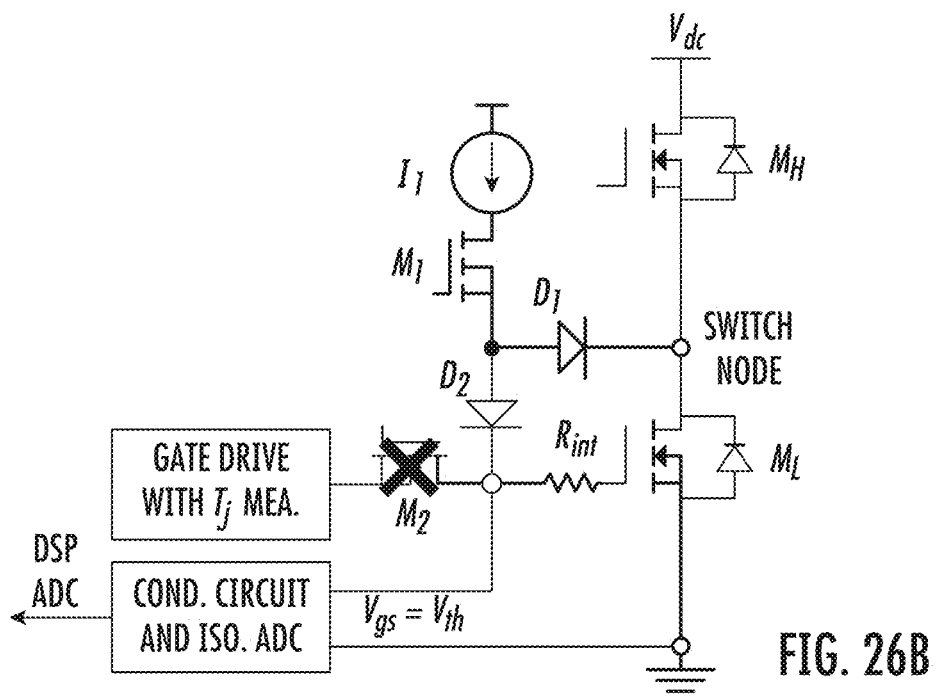

The threshold voltage of the DUT can be measured when the converter stops operation or is in idle state. The operations of the circuit 2510 are shown in FIG. 26B. At first, the gate drive output goes to zero or negative. Then M2 is turned off, and a low constant current Il is injected by turning on M2. The injected current initially flows through D2 and starts to charge the input capacitance of the SiC MOSFET. Once the gate voltage reaches to the defined threshold voltage, the switch-node voltage falls, and the injected low constant current conducts through the MOSFET. In the steady-state, the gate voltage remains at Vth, and this value is measured by the microcontroller through the conditioning circuits and isolated ADC. Throughout the aging of the device, the measured Vth values together with the ambient temperature information (measured either from the controller's on-chip ambient temperature sensor or an external on-board ambient temperature sensor) can be stored in the controller (or elsewhere) when the converter is not operating. Based on the sensitivity of Vth over Tj the percentage of the threshold voltage offset is derived over aging. This offset (in percentage) can then added to the Tdon versus Tj curve to compensate the aging's impact. With the proposed circuit, the threshold voltage shift over aging can be compensated to achieve an accurate Tj measurement despite aging of the SiC MOSFET.

Figure 27:
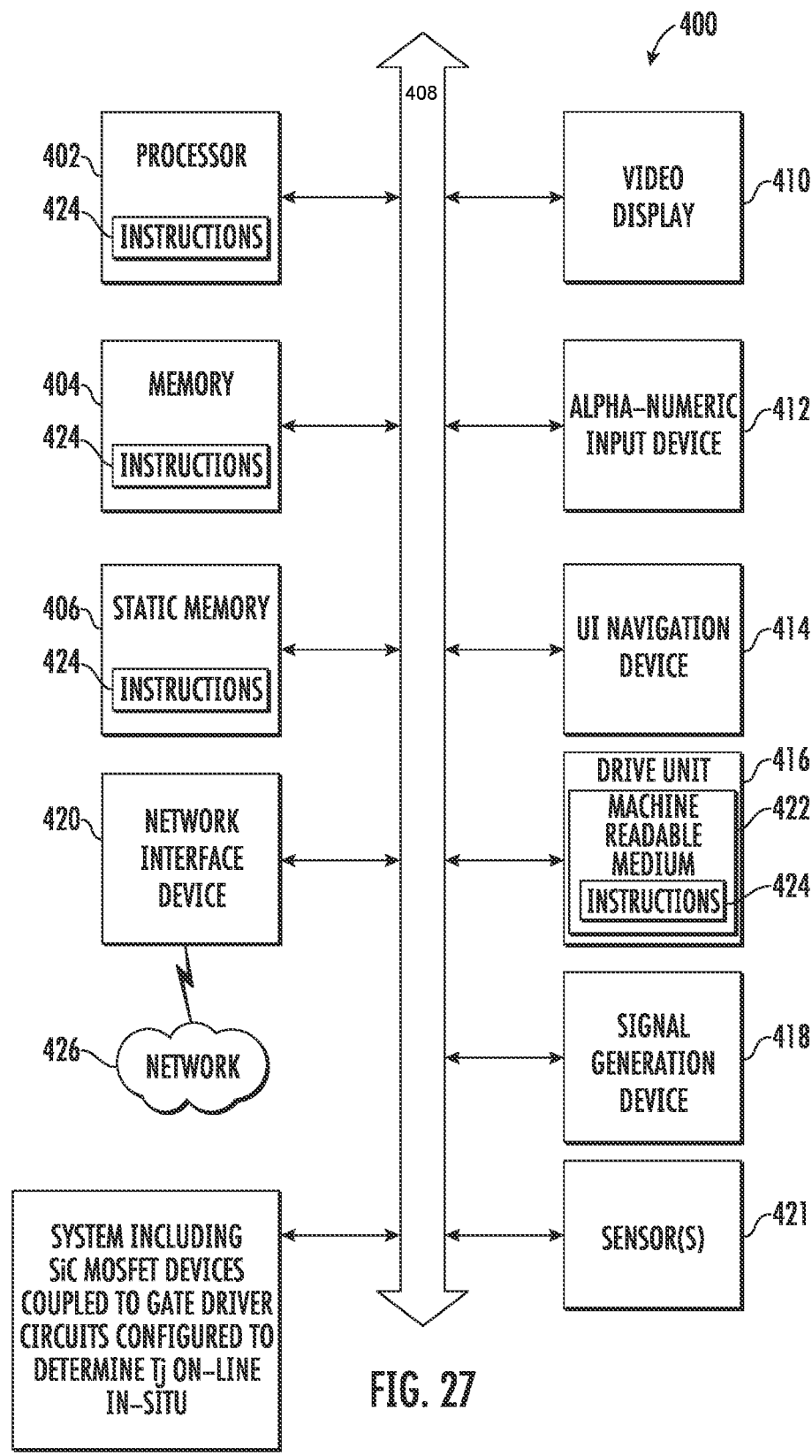
FIG. 27 is a block diagram of a computing system that can be used to perform processor-executable instructions represented by non-transitory processor-readable media to carry out the operations described herein in some embodiments according to the invention.

FIG. 27 is a block diagram illustrating an example of a machine upon which one or more aspects of embodiments of the present invention can be implemented. For example the block diagram of FIG. 27 illustrates a computing system that can be used to perform processor-executable instructions represented by non-transitory processor-readable media to carry out the operations shown in some of the embodiments according to the invention. An aspect of an embodiment of the present invention includes, but not limited thereto, a system 499 includes SiC MOSFET devices for which junction temperature is to be measured in real-time by generating a pulse having a width that represents the turn-on delay of the SiC MOSFET. The width of the pulse can be generated by detecting the time that the SiC first begins to turn on via the gat-source voltage and the time the drain current begins to flow. The pulse can be shaped by generating two signal edges (one for each time described above) and using those signal edges to for the leading and trailing edges of the pulse that indicates the turn on delay. Further operation can control a gate driver circuit with an adjustable resistance (large/small) that can be selected based on the mode of operation. For example, a small resistance value can be used to drive the gate voltage when the SIC MOSFET operates in an application environment (such as a converter application) to reduce switching loss whereas the resistance can be changed to a larger value when the SiC MOSFET is operated to monitor the junction temperature in some embodiments so as to increase the accuracy of the measurement. In still other embodiments, operations can be used to monitor the threshold voltage of the SiC MOSFET over time so that measurement of the junction temperature can be made more accurate by compensating the measured junction temperature for aging that causes an increase in the threshold voltage.

Examples of machine 400 can include logic, one or more components, circuits (e.g., modules), or mechanisms. Circuits are tangible entities configured to perform certain operations. In an example, circuits can be arranged (e.g., internally or with respect to external entities such as other circuits) in a specified manner. In an example, one or more computer systems (e.g., a standalone, client or server computer system) or one or more hardware processors (processors) can be configured by software (e.g., instructions, an application portion, or an application) as a circuit that operates to perform certain operations as described herein. In an example, the software can reside (1) on a non-transitory machine readable medium or (2) in a transmission signal. In an example, the software, when executed by the underlying hardware of the circuit, causes the circuit to perform the certain operations.

In an example, a circuit can be implemented mechanically or electronically. For example, a circuit can comprise dedicated circuitry or logic that is specifically configured to perform one or more techniques such as discussed above, such as including a special-purpose processor, a field programmable gate array (FPGA) or an application-specific integrated circuit (ASIC). In an example, a circuit can comprise programmable logic (e.g., circuitry, as encompassed within a general-purpose processor or other programmable processor) that can be temporarily configured (e.g., by software) to perform the certain operations. It will be appreciated that the decision to implement a circuit mechanically (e.g., in dedicated and permanently configured circuitry), or in temporarily configured circuitry (e.g., configured by software) can be driven by cost and time considerations.

Accordingly, the term "circuit" is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor, for example, to constitute a particular circuit at one instance of time and to constitute a different circuit at a different instance of time.

In an example, circuits can provide information to, and receive information from, other circuits. In this example, the circuits can be regarded as being communicatively coupled to one or more other circuits. Where multiple of such circuits exist contemporaneously, communications can be achieved through signal transmission (e.g., over appropriate circuits and buses) that connect the circuits. In embodiments in which multiple circuits are configured or instantiated at different times, communications between such circuits can be achieved, for example, through the storage and retrieval of information in memory structures to which the multiple circuits have access. For example, one circuit can perform an operation and store the output of that operation in a memory device to which it is communicatively coupled. A further circuit can then, later, access the memory device to retrieve and process the stored output. In an example, circuits can be configured to initiate or receive communications with input or output devices and can operate on a resource (e.g., a collection of information).

The various operations of method examples described herein can be performed, at least partially, by one or more processors that are temporarily configured (e.g., by software) or permanently configured to perform the relevant operations. Whether temporarily or permanently configured, such processors can constitute processor-implemented circuits that operate to perform one or more operations or functions. In an example, the circuits referred to herein can comprise processor-implemented circuits.

Similarly, the methods described herein can be at least partially processor implemented. For example, at least some of the operations of a method can be performed by one or processors or processor-implemented circuits. The performance of certain of the operations can be distributed among the one or more processors, not only residing within a single machine, but deployed across a number of machines. In an example, the processor or processors can be in a single location (e.g., within a home environment, an office environment or as a server farm), while in other examples the processors can be distributed across several locations.

The one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., Application Program Interfaces (APIs).)

Example embodiments (e.g., apparatus, systems, or methods) can be implemented in digital electronic circuitry, in computer hardware, in firmware, in software, or in any combination thereof. Example embodiments can be implemented using a computer program product (e.g., a computer program, tangibly embodied in an information carrier or in a machine readable medium, for execution by, or to control the operation of, data processing apparatus such as a programmable processor, a computer, or multiple computers).

A computer program can be written in any form of programming language, including compiled or interpreted languages, and it can be deployed in any form, including as a stand-alone program or as a software module, subroutine, or other unit suitable for use in a computing environment. A computer program can be deployed to be executed on one computer or on multiple computers at one site or distributed across multiple sites and interconnected by a communication network.

In an example, operations can be performed by one or more programmable processors executing a computer program to perform functions by operating on input data and generating output. Examples of method operations can also be performed by, and example apparatus can be implemented as, special purpose logic circuitry (e.g., a field programmable gate array (FPGA) or an application-specific integrated circuit (ASIC)).

The computing system can include clients and servers. A client and server are generally remote from each other and generally interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine 400) and software architectures that can be deployed in example embodiments. In an example, the machine 400 can operate as a standalone device or the machine 400 can be connected (e.g., networked) to other machines.

In a networked deployment, the machine 400 can operate in the capacity of either a server or a client machine in server-client network environments. In an example, machine 400 can act as a peer machine in peer-to-peer (or other distributed) network environments. The machine 400 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) specifying actions to be taken (e.g., performed) by the machine 400. Further, while only a single machine 400 is illustrated, the term "machine" shall also be taken to include any collection of machines that individually or jointly execute a set (or multiple sets) of instructions to perform any one or more of the methodologies discussed herein.

Example machine (e.g., computer system) 400 can include a processor 402 (e.g., a central processing unit (CPU), a graphics processing unit (GPU) or both), a main memory 404 and a static memory 406, some or all of which can communicate with each other via a bus 408. The machine 400 can further include a display unit 410, an alphanumeric input device 412 (e.g., a keyboard), and a user interface (UI) navigation device 414 (e.g., a mouse). In an example, the display unit 410, input device 412 and UI navigation device 414 can be a touch screen display. The machine 400 can additionally include a storage device (e.g., drive unit) 416, a signal generation device 418 (e.g., a speaker), a network interface device 420, and one or more sensors 421, such as a global positioning system (GPS) sensor, compass, accelerometer, or other sensor.

The storage device 416 can include a machine readable medium 422 on which is stored one or more sets of data structures or instructions 424 (e.g., software) embodying or utilized by any one or more of the methodologies or functions described herein. The instructions 424 can also reside, completely or at least partially, within the main memory 404, within static memory 406, or within the processor 402 during execution thereof by the machine 400. In an example, one or any combination of the processor 402, the main memory 404, the static memory 406, or the storage device 416 can constitute machine readable media.

While the machine readable medium 422 is illustrated as a single medium, the term "machine readable medium" can include a single medium or multiple media (e.g., a centralized or distributed database, and/or associated caches and servers) that configured to store the one or more instructions 424. The term "machine readable medium" can also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine readable medium" can accordingly be taken to include, but not be limited to, solid-state memories, and optical and magnetic media. Specific examples of machine readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 424 can further be transmitted or received over a communications network 426 using a transmission medium via the network interface device 420 utilizing any one of a number of transfer protocols (e.g., frame relay, IP, TCP, UDP, HTTP, etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 standards family known as Wi-Fi®, IEEE 802.16 standards family known as WiMax®), peer-to-peer (P2P) networks, among others. The term "transmission medium" shall be taken to include any intangible medium that is capable of storing, encoding or carrying instructions for execution by the machine, and includes digital or analog communications signals or other intangible medium to facilitate communication of such software.

The terminology used herein is for the purpose of describing embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wired, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages, such as a programming language for a FPGA, Verilog, System Verilog, Hardware Description language (HDL), and VHDL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems, and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

While the foregoing is directed to aspects of the present disclosure, other and further embodiments of the disclosure may be devised without departing from the basic scope thereof, and the scope thereof is determined by the claims that follow.

What is claimed is:

1. A method of measuring a junction temperature of an SiC MOSFET, the method comprising:
applying a gate-source voltage to an external gate loop coupled to a gate of the SiC MOSFET;
detecting a first time when the gate-source voltage exceeds a first value configured to disable conduction of a current in a drain of the SiC MOSFET;
detecting, after the first time, a second time when a voltage across a common source inductance in a package of the SiC MOSFET indicates that the current in the drain is greater than a reference value;
defining a time interval from the first time to the second time as a turn on delay time of the SiC MOSFET; and
determining the junction temperature for the SiC MOSFET using the turn on delay time.

2. The method of claim 1, further comprising:
decoupling the gate-source voltage from the gate of the SiC MOSFET;
injecting a constant current into the gate of the SiC MOSFET to charge an input capacitance to provide a test threshold voltage at the gate;
switching the constant current from the gate to the drain of the SiC MOSFET responsive to the test threshold voltage being sufficient to form a channel region in the SiC MOSFET to conduct the constant current;

measuring the test threshold voltage sufficient to form the channel region to provide a current threshold voltage for the SiC MOSFET; and using the current threshold voltage for the SiC MOSFET to adjust the junction temperature to compensate for aging of the SiC MOSFET.

3. The method of claim 1, wherein the detecting the first time when the gate-source voltage exceeds the first value configured to disable conduction of the current in the drain of the SiC MOSFET comprises detecting an increase in the gate-source voltage of about 10%.

4. The method of claim 1, wherein detecting, after the first time, the second time further comprises:

generating a signal edge corresponding to when the voltage across the common source inductance in the package of the SiC MOSFET indicates that the current in the drain has exceeded the reference value to provide the second time; and filtering generation of subsequent signal edges resulting from changes in the voltage across the common source inductance exceeding the reference value after the second time.

5. The method of claim 1, wherein the detecting the first time when the gate-source voltage exceeds the first value configured to disable conduction of the current in the drain of the SiC MOSFET comprises:

comparing the gate-source voltage to the first value to provide a leading edge of a signal indicating a start of when the SiC MOSFET turns on;

comparing the voltage across the common source inductance to the reference value to provide a trailing edge of the signal corresponding to when the current in the drain begins;

filtering generation of subsequent signal edges resulting from changes in the voltage across the common source inductance exceeding the reference value after the second time;

combining the leading edge and the trailing edge to provide a pulse having a time width; and transmitting the pulse to a microcontroller circuit to determine the junction temperature for the SiC MOSFET.

6. The method of claim wherein determining the junction temperature for the SiC MOSFET using the turn on delay time is performed in real-time.

7. The method of claim further comprising:

interrupting operation of the SiC MOSFET responsive to determining that the junction temperature for the SiC MOSFET exceeds a safe operating condition specified for a circuit in which the SiC MOSFET is embedded.

8. The method of claim further comprising:

before applying the gate-source voltage, switching from a first resistance included in the external gate loop coupled to the gate of the SiC MOSFET to a second resistance included in the external gate loop that is greater than the first resistance; and after detecting the second time, switching from the second resistance to the first resistance.

9. The method of claim 8, wherein after detecting the second time comprises:

after determining the junction temperature for the SiC MOSFET, receiving a signal from a microcontroller to switch from the second resistance to the first resistance.

10. The method of claim 8, wherein the second resistance comprises a resistance value sufficient to determine the junction temperature to within an error of at least about 1 degree Centigrade.

* * * * *

UNITED STATES PATENT AND TRADEMARK OFFICE
CERTIFICATE OF CORRECTION

| | |
|---|---|
| PATENT NO. | : 11,525,740 B2 |
| APPLICATION NO. | : 16/908997 |
| DATED | : December 13, 2022 |
| INVENTOR(S) | : Akin et al. |

It is certified that error appears in the above-identified patent and that said Letters Patent is hereby corrected as shown below:

In the Claims

Column 20, Claim 6, Line 10: Please correct "The method of claim wherein"
To read -- The method of claim 1 wherein --

Column 20, Claim 7, Line 13: Please correct "The method of claim wherein"
To read -- The method of claim 1 wherein --

Column 20, Claim 8, Line 18: Please correct "The method of claim wherein"
To read -- The method of claim 1 wherein --

Signed and Sealed this
Twenty-eighth Day of March, 2023

Katherine Kelly Vidal
*Director of the United States Patent and Trademark Office*